United States Patent
Rokos

(10) Patent No.: US 11,841,917 B2
(45) Date of Patent: Dec. 12, 2023

(54) DIGITAL MULTIMEDIA PINPOINT BOOKMARK DEVICE, METHOD, AND SYSTEM

(71) Applicant: Enemy Tree LLC, Lincoln, CA (US)

(72) Inventor: John P. Rokos, Portland, OR (US)

(73) Assignee: Enemy Tree LLC, Lincoln, CA (US)

( * ) Notice: Subject to any disclaimer, the term of this patent is extended or adjusted under 35 U.S.C. 154(b) by 33 days.

(21) Appl. No.: 17/526,924

(22) Filed: Nov. 15, 2021

(65) Prior Publication Data
US 2022/0075839 A1    Mar. 10, 2022

Related U.S. Application Data

(63) Continuation-in-part of application No. 16/903,308, filed on Jun. 16, 2020, now Pat. No. 11,182,450, (Continued)

(51) Int. Cl.
*G06F 3/0483*  (2013.01)
*G06F 16/955*  (2019.01)
(Continued)

(52) U.S. Cl.
CPC .......... *G06F 16/9562* (2019.01); *G06F 3/012* (2013.01); *G06F 3/0482* (2013.01);
(Continued)

(58) Field of Classification Search
CPC .. G06F 16/9562; G06F 3/012; G06F 3/04817; G06F 3/0482; G06F 3/0483;
(Continued)

(56) References Cited

U.S. PATENT DOCUMENTS

| | | | |
|---|---|---|---|
| 5,663,748 A | * | 9/1997 | Huffman ............. G06F 15/0283 700/83 |
| 6,219,679 B1 | | 4/2001 | Brisebois et al. |

(Continued)

FOREIGN PATENT DOCUMENTS

| | | | | |
|---|---|---|---|---|
| EP | 2500810 A3 | 10/2012 | | |
| WO | WO-2013009047 A2 | * 1/2013 | ........... G02B 27/017 |

(Continued)

OTHER PUBLICATIONS

Raphael Grasset; Andreas Dunser; Mark Billinghurst, The design of a mixed-reality book: Is it still a real book?, 2008, 4 pages (Year: 2008).*

(Continued)

*Primary Examiner* — Yongjia Pan
(74) *Attorney, Agent, or Firm* — Renaissance IP Law Group, LLP; David A. Crowther

(57) ABSTRACT

Embodiments of the inventive concept enable a user to define exactly what and/or where they would like to set a digital pinpoint bookmark, and at a later time, engage the use of the pinpoint bookmark so that they can jump back to the very spot where they left off. In an augmented reality environment, the pinpoint bookmark may point to a real object or a virtual object. In a virtual reality environment, the pinpoint bookmark may point to a virtual object. The pinpoint bookmark is a visual mark that overlays the digital content and that points directly to the spot (i.e., directly to a punctuation mark, letter, word, paragraph, image, video clip, audio clip, real object, virtual object, or the like) so that it is easy and quick for the user to get back to the exact position. The pinpoint bookmark can be cleared using a button. Multiple pinpoint bookmarks across various different personal computing devices associated with a single user (Continued)

can be centrally stored and managed using a remote pinpoint bookmark database.

17 Claims, 29 Drawing Sheets

Related U.S. Application Data which is a continuation of application No. 15/914,251, filed on Mar. 7, 2018, now Pat. No. 10,754,910.

(60) Provisional application No. 62/467,826, filed on Mar. 7, 2017.

(51) Int. Cl.

| | | |
|---|---|---|
| *G06F 3/04817* | (2022.01) | |
| *G06F 3/0485* | (2022.01) | |
| *G06F 3/0482* | (2013.01) | |
| *G06F 16/41* | (2019.01) | |
| *G06F 3/01* | (2006.01) | |
| *H04L 67/131* | (2022.01) | |
| *H04L 67/1097* | (2022.01) | |
| *G06F 3/04845* | (2022.01) | |
| *H04L 67/10* | (2022.01) | |

(52) U.S. Cl.
CPC .......... *G06F 3/0483* (2013.01); *G06F 3/0485* (2013.01); *G06F 3/04817* (2013.01); *G06F 16/41* (2019.01); *H04L 67/131* (2022.05); *G06F 3/04845* (2013.01); *H04L 67/10* (2013.01); *H04L 67/1097* (2013.01)

(58) Field of Classification Search
CPC .... G06F 3/0485; G06F 16/41; G06F 3/04845; G06F 3/04842; G06F 3/011; H04L 67/131; H04L 67/10; H04L 67/1097; G06V 20/20

See application file for complete search history.

(56) References Cited

U.S. PATENT DOCUMENTS

| | | | |
|---|---|---|---|
| 6,992,687 B1 | 1/2006 | Baird et al. | |
| 7,149,982 B1 | 12/2006 | Duperrouzel et al. | |
| 7,640,513 B2* | 12/2009 | Card | G06F 3/0483 |
| | | | 715/776 |
| 8,046,323 B2 | 10/2011 | Ma et al. | |
| 8,225,194 B2 | 7/2012 | Rechsteiner et al. | |
| 8,533,199 B2 | 9/2013 | Malla | |
| 9,098,480 B2 | 8/2015 | Kim et al. | |
| 9,182,815 B2* | 11/2015 | Small | G06F 3/011 |
| 9,229,231 B2* | 1/2016 | Small | G06F 3/167 |
| 9,268,858 B1 | 2/2016 | Yacoub et al. | |
| 10,921,599 B2* | 2/2021 | Hoover | G06F 3/013 |
| 2004/0205543 A1 | 10/2004 | Awada et al. | |
| 2008/0263441 A1 | 10/2008 | Park et al. | |
| 2011/0173524 A1 | 7/2011 | Chan et al. | |
| 2012/0089938 A1* | 4/2012 | Homma | G06F 3/0488 |
| | | | 715/776 |
| 2012/0113223 A1* | 5/2012 | Hilliges | G06F 3/011 |
| | | | 348/46 |
| 2012/0210269 A1 | 8/2012 | Yonemoto | |
| 2012/0212460 A1* | 8/2012 | Hagg | G06F 16/907 |
| | | | 345/182 |
| 2012/0216101 A1 | 8/2012 | Yonemoto | |
| 2013/0042296 A1* | 2/2013 | Hastings | G06Q 50/184 |
| | | | 726/1 |
| 2013/0047125 A1* | 2/2013 | Kangas | G06F 3/04883 |
| | | | 715/863 |
| 2013/0219322 A1* | 8/2013 | Cranfill | G06F 3/0488 |
| | | | 715/776 |
| 2013/0268832 A1 | 10/2013 | Vemireddy | |
| 2013/0321390 A1* | 12/2013 | Latta | G06T 19/006 |
| | | | 704/E21.001 |
| 2015/0206321 A1* | 7/2015 | Scavezze | G06F 3/0485 |
| | | | 345/633 |
| 2015/0362733 A1* | 12/2015 | Spivack | G02B 27/017 |
| | | | 345/633 |
| 2016/0042569 A1* | 2/2016 | Wyld | G06T 19/006 |
| | | | 345/633 |
| 2016/0210784 A1* | 7/2016 | Ramsby | G02B 27/017 |
| 2016/0224103 A1* | 8/2016 | Kochi | G06F 3/011 |
| 2016/0378296 A1* | 12/2016 | Mishra | G06T 19/006 |
| | | | 345/633 |
| 2018/0350145 A1* | 12/2018 | Byl | G06T 19/006 |

FOREIGN PATENT DOCUMENTS

| | | |
|---|---|---|
| WO | 2016109567 A1 | 7/2016 |
| WO | 2017030306 A1 | 2/2017 |

OTHER PUBLICATIONS

Raphaël Grasset, Mark Billinghurst, Andreas Dünser, Andreas Dünser, The Mixed Reality Book: A New Multimedia Reading Experience, 2007, 5 pages (Year: 2007).*

Jarkko Polvi, Takafumi Taketomi, Goshiro Yamamoto, Arindam Dey, Christian Sandor, Hirokazu Kato, SlidAR: A 3D positioning method for SLAM-based handheld augmented reality, 2015, 11 pages (Year: 2015).*

Anders Henrysson, Bringing Augmented Reality to Mobile Phones, 2007, 80 pages (Year: 2007).*

PCT/US2018/021297 International Search Report.

PCT/US2018/021297 Written Opinion of the International Searching Authority; dated Jun. 22, 2018.

* cited by examiner

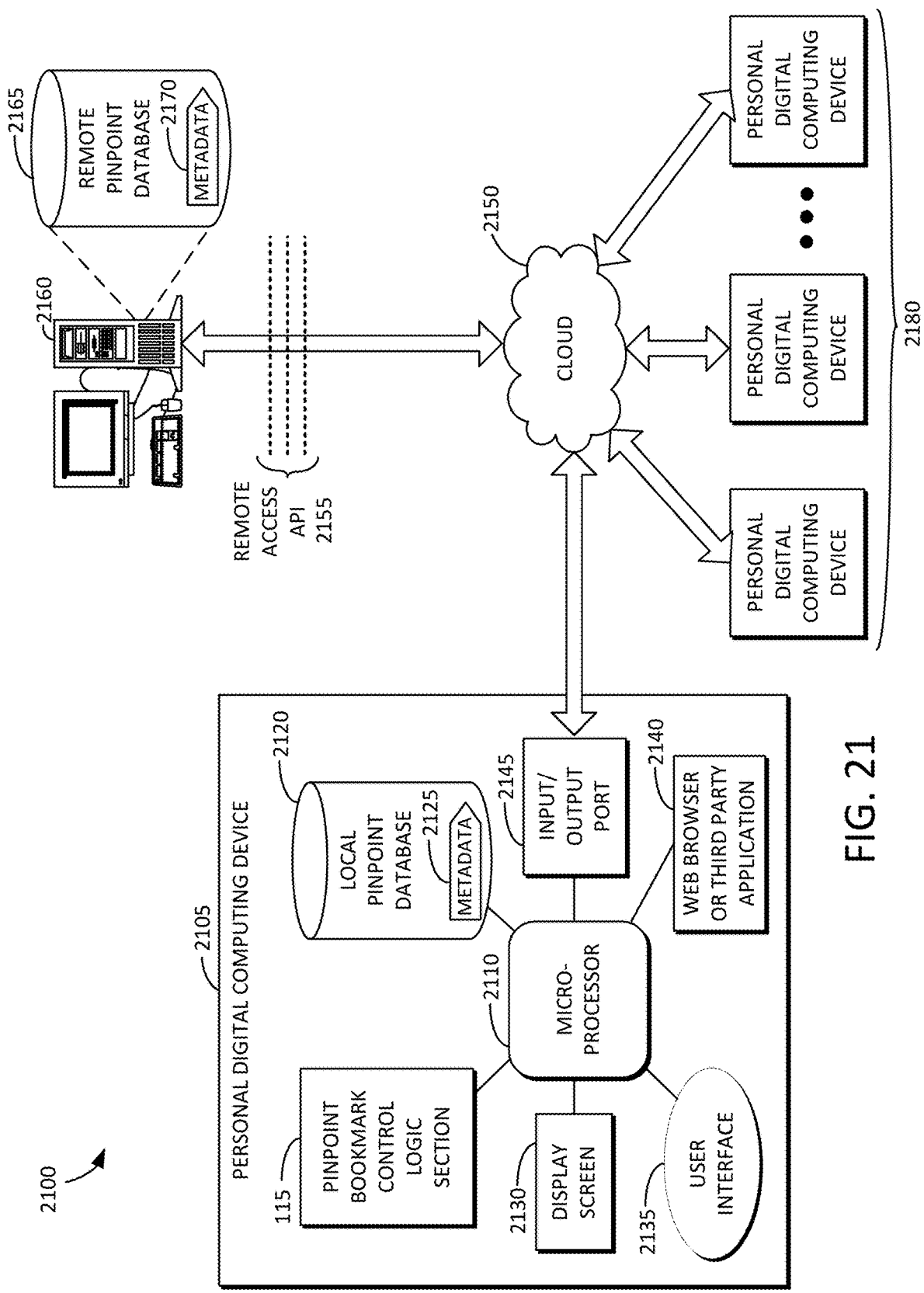

DIGITAL MULTIMEDIA PINPOINT BOOKMARK DEVICE, METHOD, AND SYSTEM

RELATED APPLICATION DATA

This application is a continuation-in-part of commonly-owned U.S. application Ser. No. 16/903,308, filed on Jun. 16, 2020, which is a continuation of U.S. application Ser. No. 15/914,251, filed on Mar. 7, 2018, which claims the benefit of U.S. Provisional App. Ser. No. 62/467,826, filed on Mar. 7, 2017, which are hereby incorporated by reference.

TECHNICAL FIELD

This application pertains to bookmarking within digital content, and more particularly, to devices, methods, and systems for placing and managing pinpoint bookmarks with webpages, emails, audio content, video content, virtual reality content, third party applications, and the like.

BACKGROUND

Conventional physical and digital bookmarks are very general. They do not point to specifically where one left off, or specifically where one would like to remember to pick back up within whatever one is viewing, looking at, listening to, watching, playing, or interacting with. For example, not unlike a physical bookmark placed between two pages of a book that gets you to the last page you were at but not the specific line or word, a conventional digital bookmark for a webpage is analogous to the non-specific physical bookmark. In other words, a conventional digital bookmark can take you back to a webpage but there is no further indication where you actually left off reading, or what you were last doing. There is also no way to manage multiple pinpoint bookmarks within the same content, or across various different media, types of content, or across different computing devices.

Accordingly, a need remains for improved methods and systems for setting and managing digital pinpoint bookmarks in any kind of media content coordinated across multiple computing devices. Embodiments of the inventive concept address these and other limitations in the prior art.

BRIEF DESCRIPTION OF THE DRAWINGS

FIG. 21 illustrates a block diagram of a system including multiple digital computing devices each having a local pinpoint database, and a remote server having a remote pinpoint bookmark database in accordance with various embodiments of the present inventive concept.

Figure 1A:
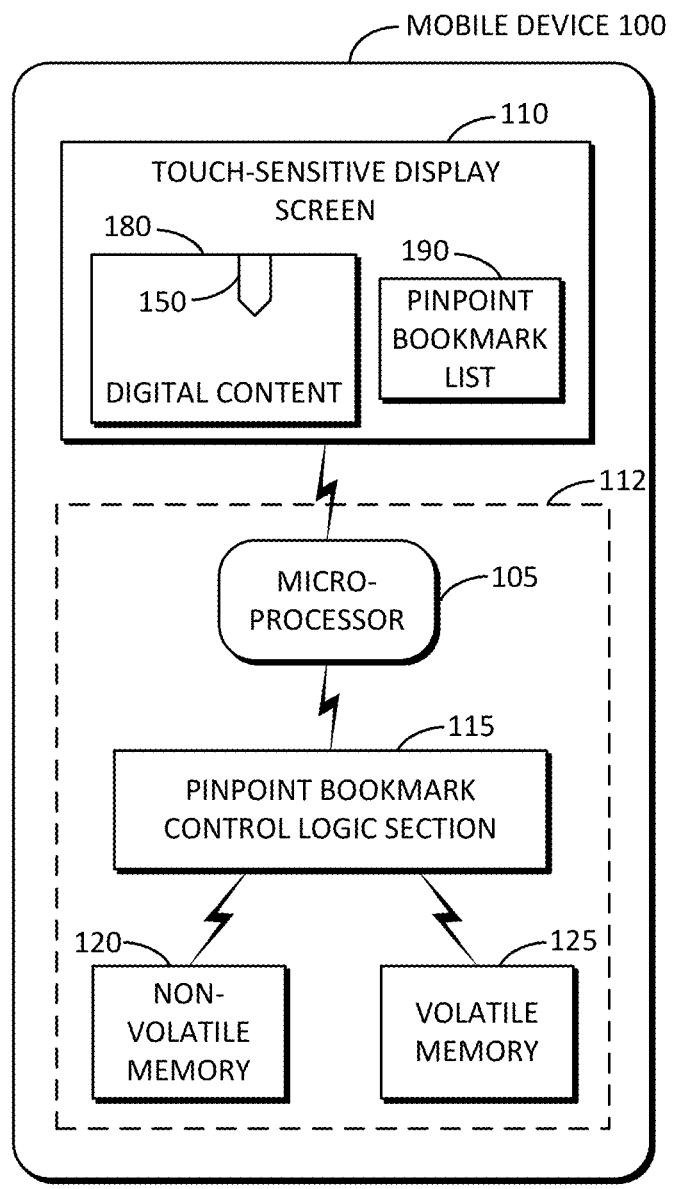
FIG. 1A illustrates a block diagram of an example mobile device including a pinpoint bookmark control logic section in accordance with various embodiments of the present inventive concept.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first mobile device could be termed a second mobile device, and, similarly, a second mobile device could be termed a first mobile device, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the inventive concept enable a user to define exactly what and/or where they would like to set a digital pinpoint bookmark within digital content, and at a later time, engage the use of the digital pinpoint bookmark so that they can jump back to the very spot within the digital content where they left off. Even though the term "bookmark" is used herein, such a term is not intended to limit the applicability of the inventive concepts disclosed herein to "books." Rather, the term "bookmark" is used as a term of art applicable to bookmarks associated with digital content. The digital pinpoint bookmark is a visual mark that overlays the digital content and that points directly to the spot so that it is easy and quick for the user to get back to the exact position within the digital content whenever the user chooses. In some embodiments, the digital pinpoint bookmark points to a specific point, to a larger selection, to an object, or the like. The digital pinpoint bookmark can have a clear button that allows for easy removal of the digital pinpoint bookmark at any time.

When the point at which the digital pinpoint bookmark is partially or completely out of view of the presently visible page, an indication that the digital pinpoint bookmark is nevertheless present above, below, or to either side of the presently visible page can be shown. In some embodiments, a button or icon can be presented to the user that when activated (e.g., pressed with a human finger, clicked using a mouse, selected using a stylus, or the like), the presently visible page can be automatically scrolled in the direction of the pinpoint bookmark until it is in full view. For example, when a user is browsing information on a webpage and sees the button or icon, a simple gesture by the user can cause the visible page to scroll up, down, left, or right until the specific point, the larger selection, the object, or the like, is fully visible with the digital pinpoint bookmark pointing directly at it.

FIG. 1A illustrates a block diagram of an example mobile device 100 including a pinpoint bookmark control logic section 115 in accordance with various embodiments of the present inventive concept. The mobile device 100 can be a smart phone, a smart tablet, a laptop computer, an eBook such as a Kindle®, or the like. The mobile device 100 can include a touch-sensitive display screen 110. The mobile device can include integrated circuit devices 112 such as a microprocessor 105, a non-volatile memory 120, a volatile memory 125, and the pinpoint bookmark control logic section 115. The pinpoint bookmark control logic section 115 can include computer logic, computer code, or the like, which may be executed by the microprocessor 105. In some embodiments, the pinpoint bookmark control logic section 115 is stored in the non-volatile memory 120 and/or the volatile memory 125.

In a first mode, the touch-sensitive display screen 110 can display a pinpoint bookmark list 190. The pinpoint bookmark list 190 can show a list of previously bookmarked locations. The user can select a previously bookmarked location from the pinpoint bookmark list 190. In response to the selection, a second mode can be initiated in which the pinpoint bookmark control logic section 115 can cause the display screen 110 to jump to the digital content 180 with which the selected bookmark is associated, and cause the display screen 110 to overlay a pinpoint bookmark 150 atop the digital content 180. The pinpoint bookmark 150 can point to a specific location within the digital content 180, such as to a letter, a word, an image, or the like, as further described in detail below. The digital content 180 can include, for example, a webpage, an email, a video, an audio clip, or the like, as further described below. The pinpoint bookmark control logic section 115 can automatically reposition and/or re-size the pinpoint bookmark 150 on the touch-sensitive display screen 110 and keep it correctly positioned even if other elements shown on the display screen 110 are repositioned or re-sized. In some embodiments, the pinpoint bookmark 150 is dynamic on the webpage. For example, if a webpage loads an advertisement, or removes an element from the webpage, which as a result change the layout of the contents on the webpage, the pinpoint bookmark control logic section 115 can cause the pinpoint bookmark 150 to dynamically relocate and still maintain the pinpoint accuracy. The pinpoint bookmark 150 clearly identifies the specific location the user has bookmarked.

Figure 1B:
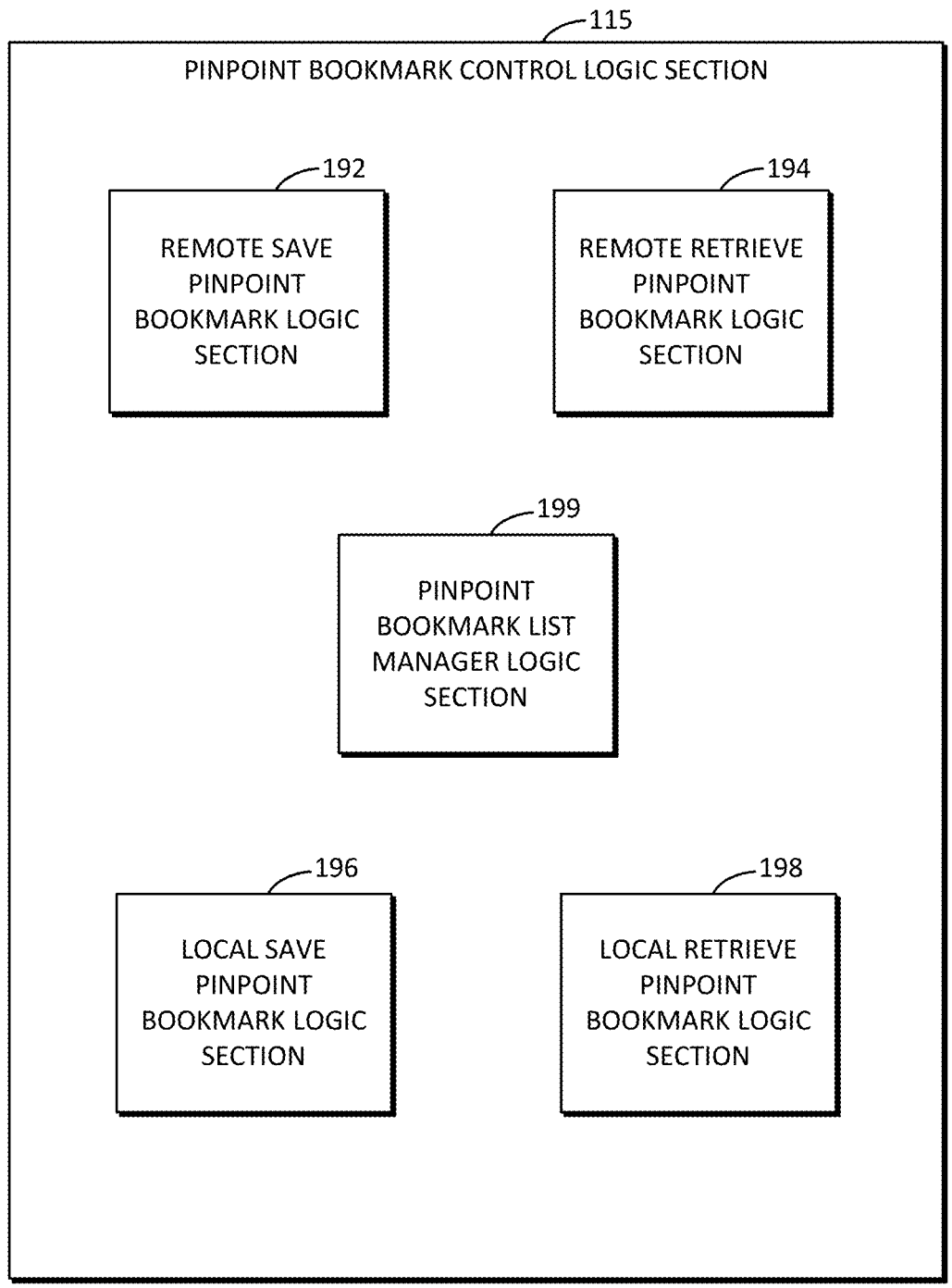
FIG. 1B illustrates additional details of the pinpoint bookmark logic section of FIG. 1A in accordance with various embodiments of the present inventive concept.

FIG. 1B illustrates additional details of the pinpoint bookmark logic section 115 of FIG. 1A in accordance with various embodiments of the present inventive concept. The pinpoint bookmark logic section 115 can include a remote save pinpoint bookmark logic section 192, a remote retrieve pinpoint bookmark logic section 194, a pinpoint bookmark list manager logic section 199, a local save pinpoint bookmark logic section 196, and a local retrieve pinpoint bookmark logic section 198. The pinpoint bookmark list manager logic section 199 can manage a central list of saved pinpoint bookmarks (e.g., pinpoint bookmark list 190 of FIG. 1A). Additional functionality of these logic blocks is explained in detail below.

Figure 1C:
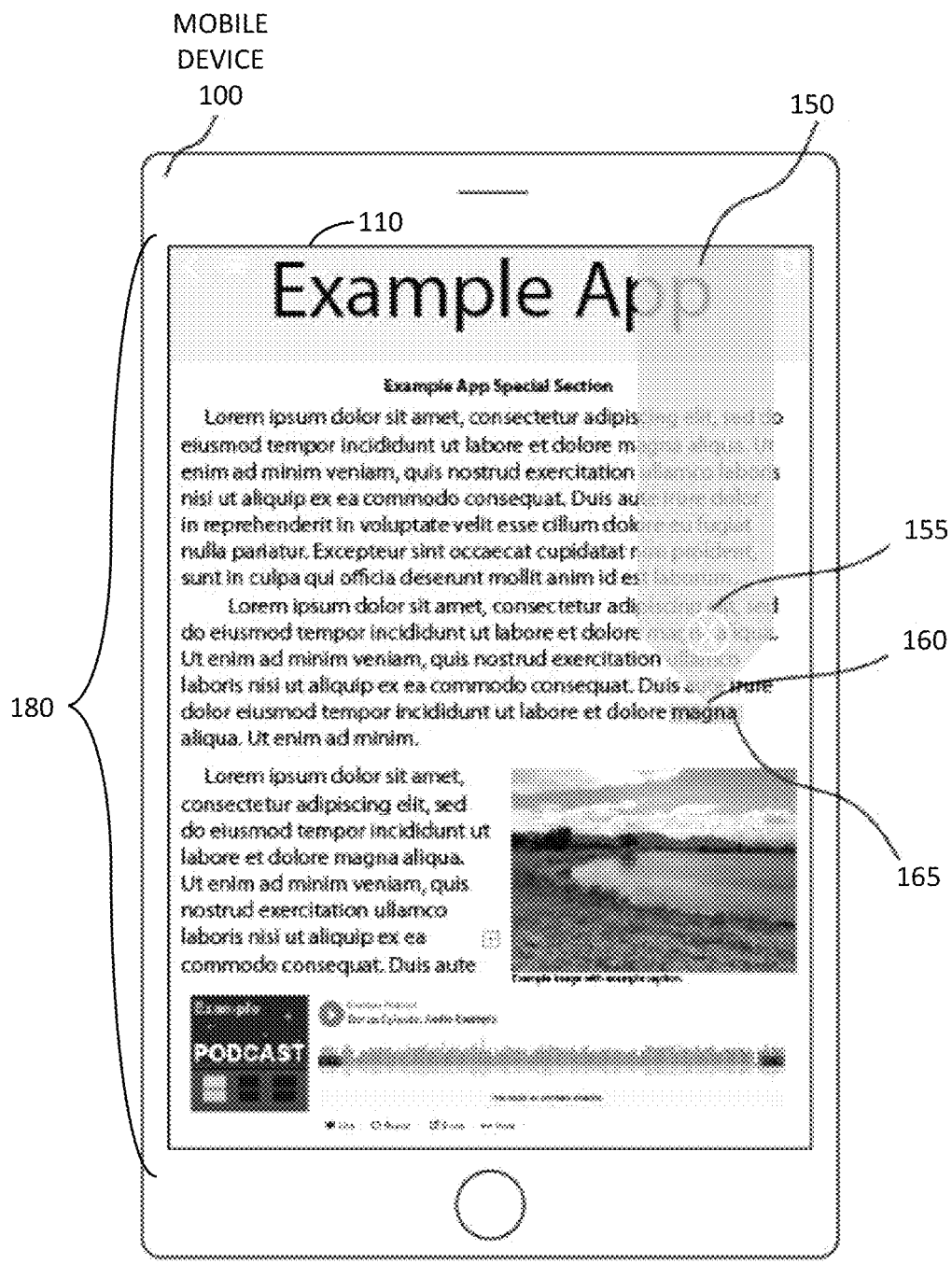
FIG. 1C illustrates a schematic diagram of a smart phone mobile device including a display screen having an example pinpoint bookmark in accordance with various embodiments of the present inventive concept.

FIG. 1C illustrates a schematic diagram of a smart phone mobile device 100 including a touch-sensitive display screen 110 showing an example pinpoint bookmark 150 in accordance with various embodiments of the present inventive concept. Reference is now made to FIGS. 1A through 1C.

Digital content 180 can be displayed on the touch-sensitive display screen 110. The pinpoint bookmark 150 can be translucent and elongated, and can include a termination point 160 that points directly to a highlighted target word 165. In some embodiments, the pinpoint bookmark 150 can be solid instead of translucent. In some embodiments, the pinpoint bookmark 150 can be an outline of a bookmark and entirely transparent in the middle. The pinpoint bookmark control logic section 115 can automatically reposition and/or re-size the pinpoint bookmark 150 and the highlighted target word 165 on the touch-sensitive display screen 110 and keep them correctly positioned relative to each other even if other elements shown on the display screen 110 are repositioned or re-sized. In some embodiments, the pinpoint bookmark 150 is dynamic on the webpage. For example, if a webpage loads an advertisement, or removes an element from the webpage, which as a result change the layout of the contents on the webpage, the pinpoint bookmark control logic section 115 can cause the pinpoint bookmark 150 to dynamically relocate and still maintain the pinpoint accuracy.

Since the pinpoint bookmark 150 is translucent, the digital content 180 is not obstructed in any significant way and is still visible through the pinpoint bookmark 150. The local save pinpoint bookmark logic section 196 of the pinpoint bookmark control logic section 115 can cause the pinpoint bookmark 150 and associated metadata to be stored locally in the non-volatile memory 120 and/or the volatile memory 125. The local retrieve pinpoint bookmark logic section 198 of the pinpoint bookmark control logic section 115 can cause the pinpoint bookmark 150 and associated metadata to be retrieved locally from the non-volatile memory 120 and/or the volatile memory 125, so that it can be displayed on the display screen 110 when the user wishes to return.

For example, the user can access the pinpoint bookmark list 190 using the pinpoint bookmark list manager logic section 199, and select a particular pinpoint bookmark (e.g., 150) from the list 190 to which the user would like to return. The bookmark list manager logic section 199 can then cause the digital content 180 having that particular pinpoint bookmark 150 to be displayed on the display screen 110 with the pinpoint bookmark 150 pointing to a specific location (e.g., word 165) within the digital content 180.

The pinpoint bookmark 150 can include a close button or icon 155. In response to the user touching or clicking on the close button or icon 155, the pinpoint bookmark 150 can be removed from the display screen 110 and/or deleted by the pinpoint bookmark control logic section 115 from the non-volatile memory 120 and/or the volatile memory 125. In addition, the pinpoint bookmark list manager logic section 199 can cause a link to the pinpoint bookmark 150 to be deleted from the pinpoint bookmark list 190.

To place a new pinpoint bookmark, the user can highlight a section of the digital content 180 such as the word 165, right click (or press and hold) on the highlighted word 165, and select a pinpoint bookmark creation menu option icon (not shown), which can cause the pinpoint bookmark 150 to appear overlaying the digital content 180 and pointing directly to the highlighted word 165. In addition, the local save pinpoint bookmark logic section 196 of the pinpoint bookmark control logic section 115 can cause the pinpoint bookmark 150 and associated metadata to be saved to the non-volatile memory 120 and/or the volatile memory 125. Moreover, the pinpoint bookmark list manager logic section 199 can add a link to the pinpoint bookmark 150 to the pinpoint bookmark list 190.

Figure 1D:
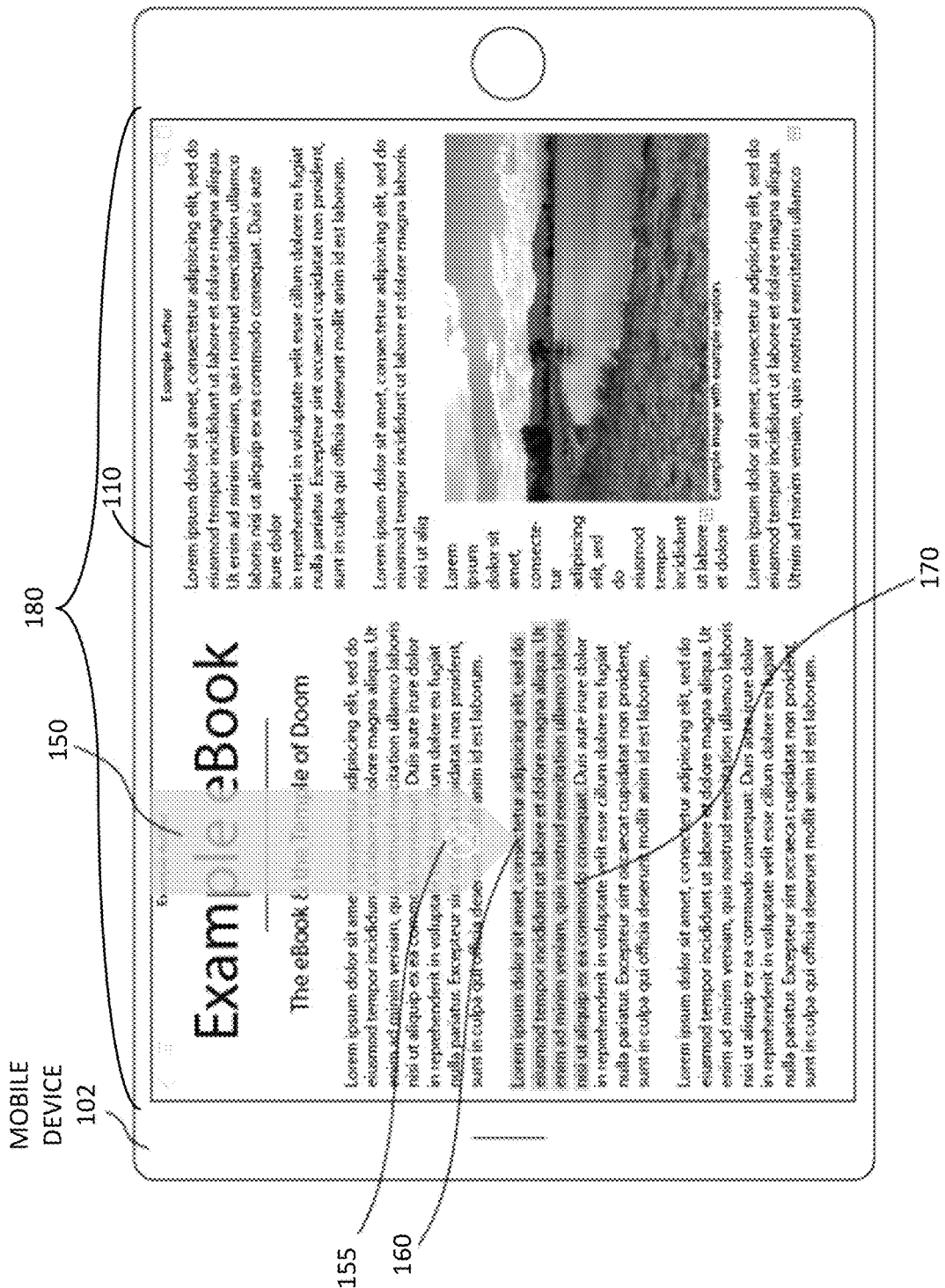
FIG. 1D illustrates a schematic diagram of a tablet mobile device including a display screen having an example pinpoint bookmark in accordance with various embodiments of the present inventive concept.

FIG. 1D illustrates a schematic diagram of a tablet mobile device 102 including a touch-sensitive display screen 110 showing an example pinpoint bookmark 150 in accordance with various embodiments of the present inventive concept. Reference is now made to FIGS. 1A, 1B, and 1D.

The digital content 180 can be displayed on the touch-sensitive display screen 110. The pinpoint bookmark 150 can be translucent and elongated, and can include a termination point 160 that points directly to a highlighted target sentence 170. The pinpoint bookmark control logic section 115 can automatically reposition and/or re-size the pinpoint bookmark 150 and the highlighted target sentence 170 on the touch-sensitive display screen 110 and keep them correctly positioned relative to each other even if other elements shown on the display screen 110 are repositioned or re-sized. The local save pinpoint bookmark logic section 196 of the pinpoint bookmark control logic section 115 can cause the pinpoint bookmark 150 and associated metadata to be stored locally in the non-volatile memory 120 and/or the volatile memory 125. The local retrieve pinpoint bookmark logic section 198 of the pinpoint bookmark control logic section 115 can cause the pinpoint bookmark 150 and associated metadata to be retrieved locally from the non-volatile memory 120 and/or the volatile memory 125, so that it can be displayed on the display screen 110 when the user wishes to return.

For example, the user can access the pinpoint bookmark list 190 using the pinpoint bookmark list manager logic section 199, and select a particular pinpoint bookmark (e.g., 150) from the list 190 to which the user would like to return. The bookmark list manager logic section 199 can then cause the digital content 180 having that particular pinpoint bookmark 150 to be displayed on the display screen 110 with the pinpoint bookmark 150 pointing to a specific location (e.g., word 165) within the digital content 180.

The pinpoint bookmark 150 can include a close button or icon 155. In response to the user touching or clicking on the close button or icon 155, the pinpoint bookmark 150 can be removed from the display screen 110 and/or deleted by the pinpoint bookmark control logic section 115 from the non-volatile memory 120 and/or the volatile memory 125. In addition, the pinpoint bookmark list manager logic section 199 can cause a link to the pinpoint bookmark 150 to be deleted from the pinpoint bookmark list 190.

To place a new pinpoint bookmark, the user can highlight a section of the digital content 180 such as the sentence 170, right click (or press and hold) on the highlighted sentence 170, and select a pinpoint bookmark creation menu option icon (not shown), which can cause the pinpoint bookmark 150 to appear overlaying the digital content 180 and pointing directly to the highlighted sentence 170. In addition, the local save pinpoint bookmark logic section 196 of the pinpoint bookmark control logic section 115 can cause the pinpoint bookmark 150 and associated metadata to be saved to the non-volatile memory 120 and/or the volatile memory 125. Moreover, the pinpoint bookmark list manager logic section 199 can add a link to the pinpoint bookmark 150 to the pinpoint bookmark list 190.

Figure 2A:
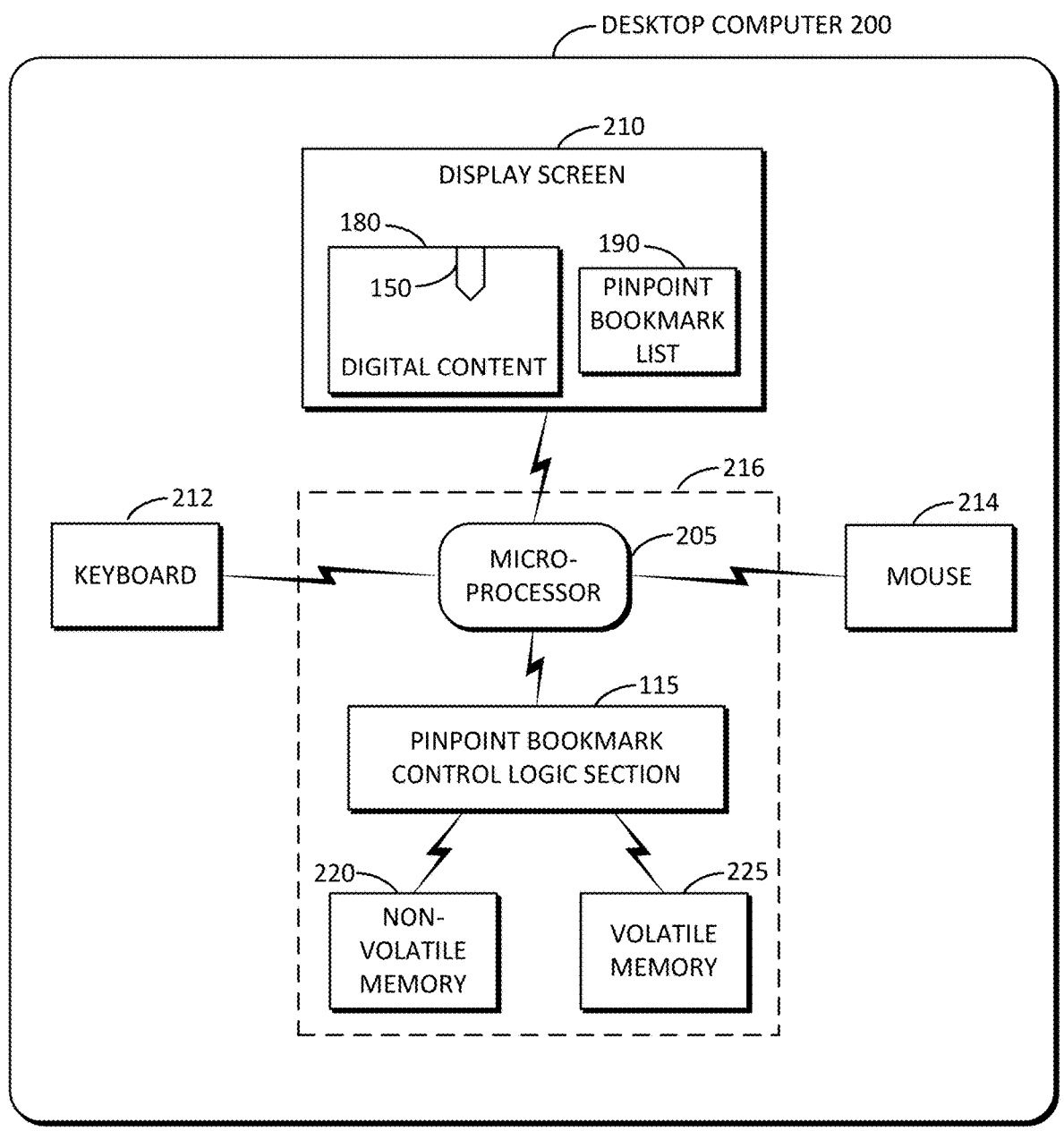
FIG. 2A illustrates a block diagram of an example desktop computer including a pinpoint bookmark control logic section in accordance with various embodiments of the present inventive concept.

FIG. 2A illustrates a block diagram of an example desktop computer 200 including a pinpoint bookmark control logic section 115 in accordance with various embodiments of the present inventive concept.

The desktop computer 200 can be a personal computer, computer workstation, computer server, or the like. The desktop computer 200 can include a display screen 210. The desktop computer 200 can include integrated circuit devices 216 such as a microprocessor 205, a non-volatile memory 220, a volatile memory 225, and the pinpoint bookmark control logic section 115. The pinpoint bookmark control logic section 115 can include computer logic, computer code, or the like, which may be executed by the microprocessor 205. In some embodiments, the pinpoint bookmark control logic section 115 is stored in the non-volatile memory 220 and/or the volatile memory 225.

In a first mode, the display screen 210 can display a pinpoint bookmark list 190. The pinpoint bookmark list 190 can show a list of previously bookmarked locations. The user can select a previously bookmarked location from the pinpoint bookmark list 190. In response to the selection, a second mode can be initiated in which the pinpoint bookmark control logic section 115 can cause the display screen 210 to jump to the digital content 180 with which the selected bookmark is associated, and cause the display screen 210 to overlay a pinpoint bookmark 150 atop the digital content 180. The pinpoint bookmark 150 can point to a specific location within the digital content 180, such as to a letter, a word, an image, or the like. The digital content 180 can include, for example, a webpage, an email, a video, an audio clip, or the like, as further described below. The desktop computer 200 can include a mouse 214 and/or a keyboard 212.

Figure 2B:
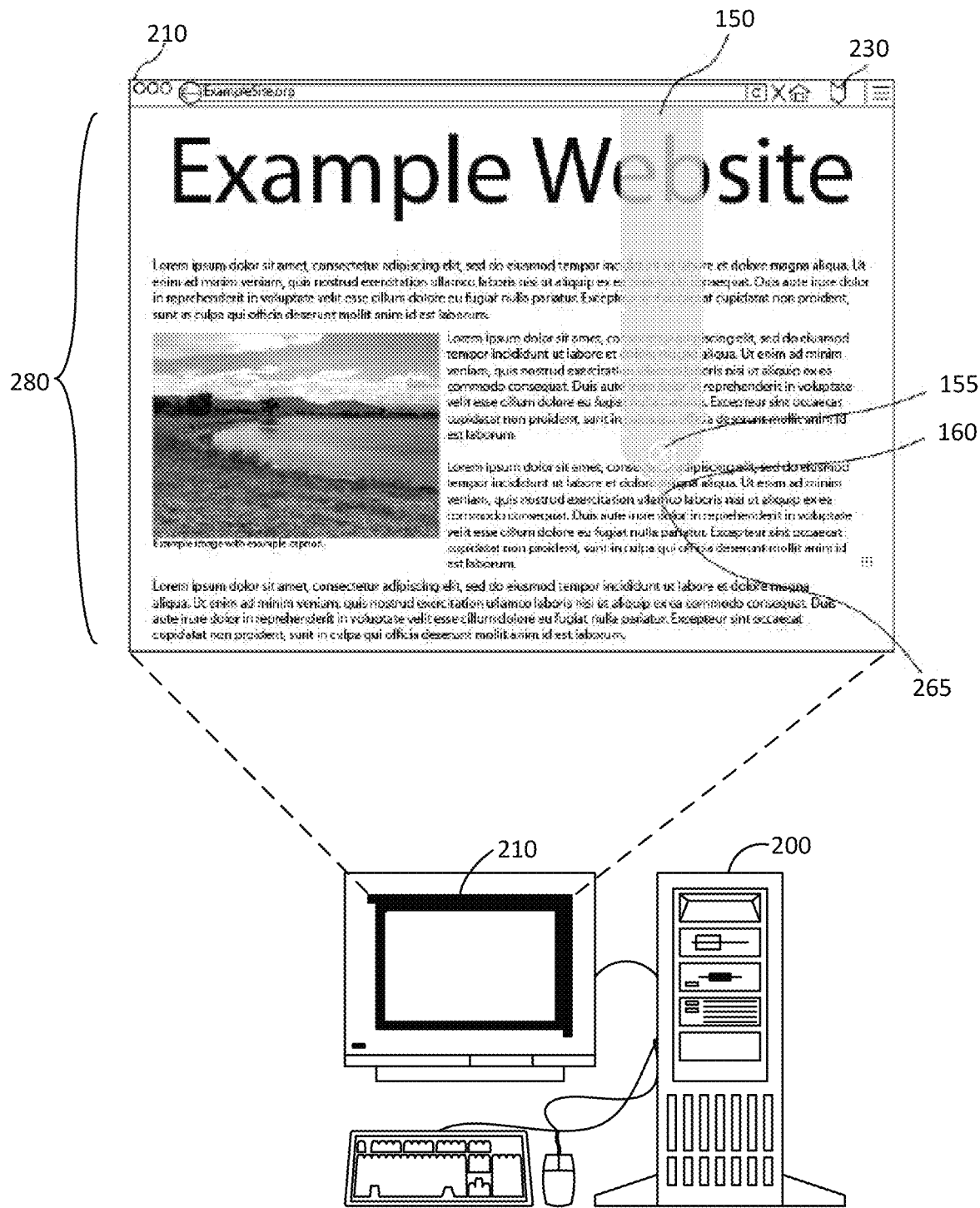
FIG. 2B illustrates a schematic diagram of the desktop computer including a display screen having an example pinpoint bookmark in accordance with various embodiments of the present inventive concept.

FIG. 2B illustrates a schematic diagram of the desktop computer 200 including a display screen 210 showing an example pinpoint bookmark 150 in accordance with various embodiments of the present inventive concept. Reference is now made to FIGS. 1B, 2A, and 2B.

The digital content 280 can be displayed on the display screen 210. The pinpoint bookmark 150 can be translucent and elongated, and can include a termination point 160 that points directly to a highlighted target letter 265. The pinpoint bookmark control logic section 115 can automatically reposition and/or re-size the pinpoint bookmark 150 and the highlighted target letter 265 on the display screen 210 and keep them correctly positioned relative to each other even if other elements shown on the display screen 210 are repositioned or re-sized. The local save pinpoint bookmark logic section 196 of the pinpoint bookmark control logic section 115 can cause the pinpoint bookmark 150 and associated metadata to be stored locally in the non-volatile memory 120 and/or the volatile memory 125. The local retrieve pinpoint bookmark logic section 198 of the pinpoint bookmark control logic section 115 can cause the pinpoint bookmark 150 and associated metadata to be retrieved locally from the non-volatile memory 120 and/or the volatile memory 125, so that it can be displayed on the display screen 210 when the user wishes to return.

For example, the user can access the pinpoint bookmark list 190 using the pinpoint bookmark list manager logic section 199, and select a particular pinpoint bookmark (e.g., 150) from the list 190 to which the user would like to return. The bookmark list manager logic section 199 can then cause the digital content 280 having that particular pinpoint bookmark 150 to be displayed on the display screen 210 with the pinpoint bookmark 150 pointing to a specific location (e.g., letter 265) within the digital content 280.

The pinpoint bookmark 150 can include a close button or icon 155. In response to the user touching or clicking on the close button or icon 155, the pinpoint bookmark 150 can be removed from the display screen 110 and/or deleted by the pinpoint bookmark control logic section 115 from the non-volatile memory 120 and/or the volatile memory 125.

To place a new pinpoint bookmark, the user can highlight a section of the digital content 280 such as the letter 265, and press the pinpoint bookmark creation button or icon 230 (or right click to bring up a sub-menu to select from), which can cause the pinpoint bookmark 150 to appear overlaying the digital content 280 and pointing directly to the highlighted letter 265. In addition, the local save pinpoint bookmark logic section 196 of the pinpoint bookmark control logic section 115 can cause the pinpoint bookmark 150 and associated metadata to be saved to the non-volatile memory 120 and/or the volatile memory 125. The user can invoke the pinpoint bookmark creation button or icon 230 using the mouse 214 or the keyboard 212. Moreover, the pinpoint bookmark list manager logic section 199 can add a link to the pinpoint bookmark 150 to the pinpoint bookmark list 190.

Figure 3A:
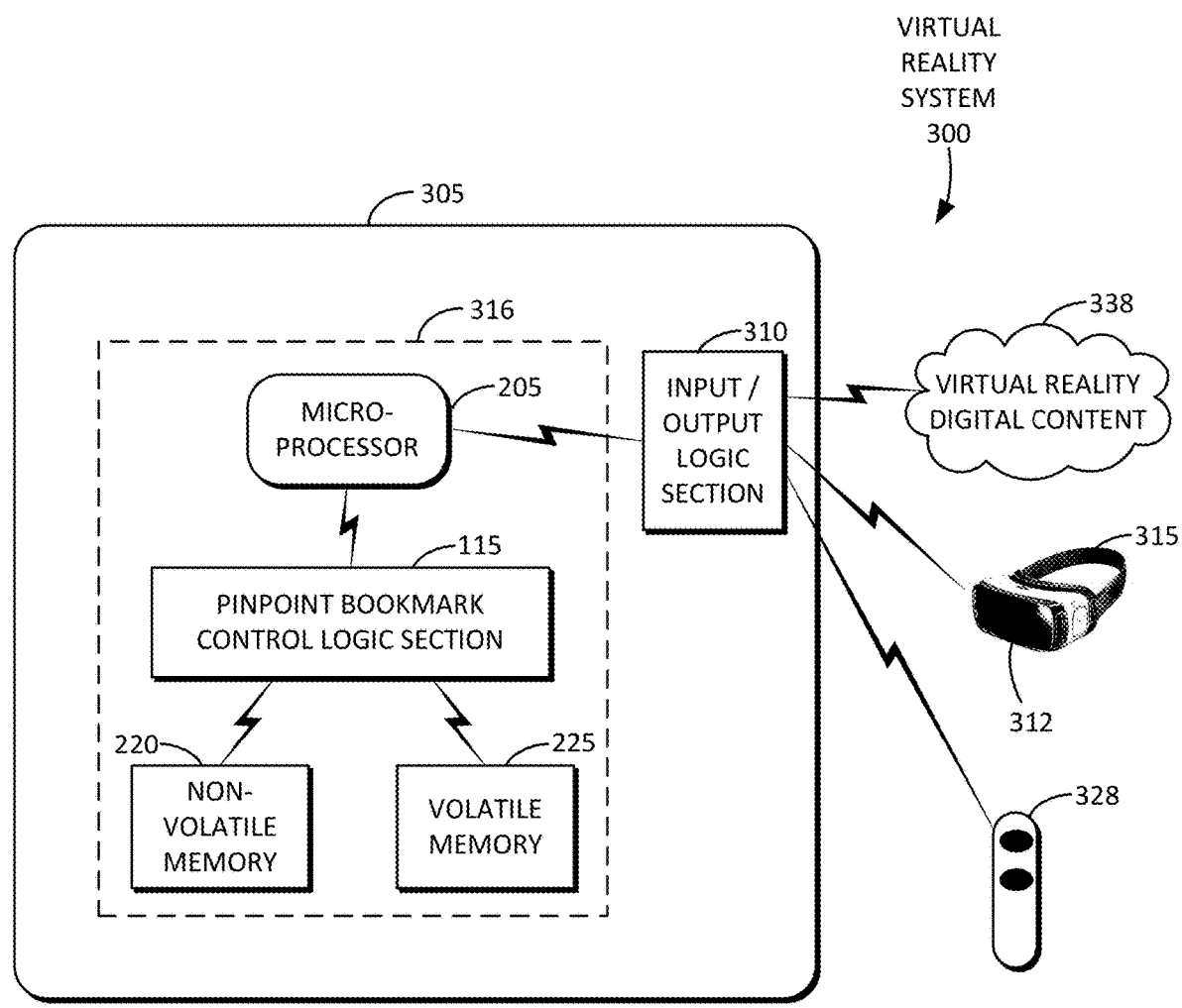
FIG. 3A illustrates a block diagram of an example virtual reality system including a pinpoint bookmark control logic section in accordance with various embodiments of the present inventive concept.

FIG. 3A illustrates a block diagram of an example virtual reality system 300 including a pinpoint bookmark control logic section 115 in accordance with various embodiments of the present inventive concept.

The virtual reality system 300 can include virtual reality head gear 315, a virtual reality hand controller 328, and a digital computing device 305. The digital computing device 305 can be a desktop computer separate from the head gear 315, a smart phone attached to the head gear 315, a mobile computer embedded within the head gear 315, or the like. The virtual reality head gear 315 can include a display screen 312. The virtual reality hand controller 328 can manipulate or select items that are viewable in the virtual reality head gear 315 to the user. The digital computing device 305 can include integrated circuit devices 316 such as a microprocessor 205, a non-volatile memory 220, a volatile memory 225, and the pinpoint bookmark control logic section 115. The virtual reality system 300 can facilitate emersion into a metaverse, for example. The pinpoint bookmark control logic section 115 can include computer logic, computer code, or the like, which may be executed by the microprocessor 205. In some embodiments, the pinpoint bookmark control logic section 115 is stored in the non-volatile memory 220 and/or the volatile memory 225.

In a first mode, the display screen 312 can display a pinpoint bookmark list (e.g., 190 of FIG. 1A). The pinpoint bookmark list 190 can show a list of previously bookmarked locations. The user can select a previously bookmarked location from the pinpoint bookmark list 190. For example, the user can grasp the virtual reality hand controller 328 and select one of the previously bookmarked locations from the pinpoint bookmark list 190. In response to the selection, a second mode can be initiated in which the pinpoint bookmark control logic section 115 can cause the display screen 312 to jump to the digital content 338 with which the selected bookmark is associated, and cause the display screen 312 to overlay a pinpoint bookmark 150 atop the digital content 338. The pinpoint bookmark 150 can point to a specific location within the digital content 338, such as to a virtual reality object, letter, a word, an image, or the like. The digital content 338 can include, for example, virtual reality content, metaverse content, a webpage, an email, a video, an audio clip, or the like, as further described below.

Figure 3B:
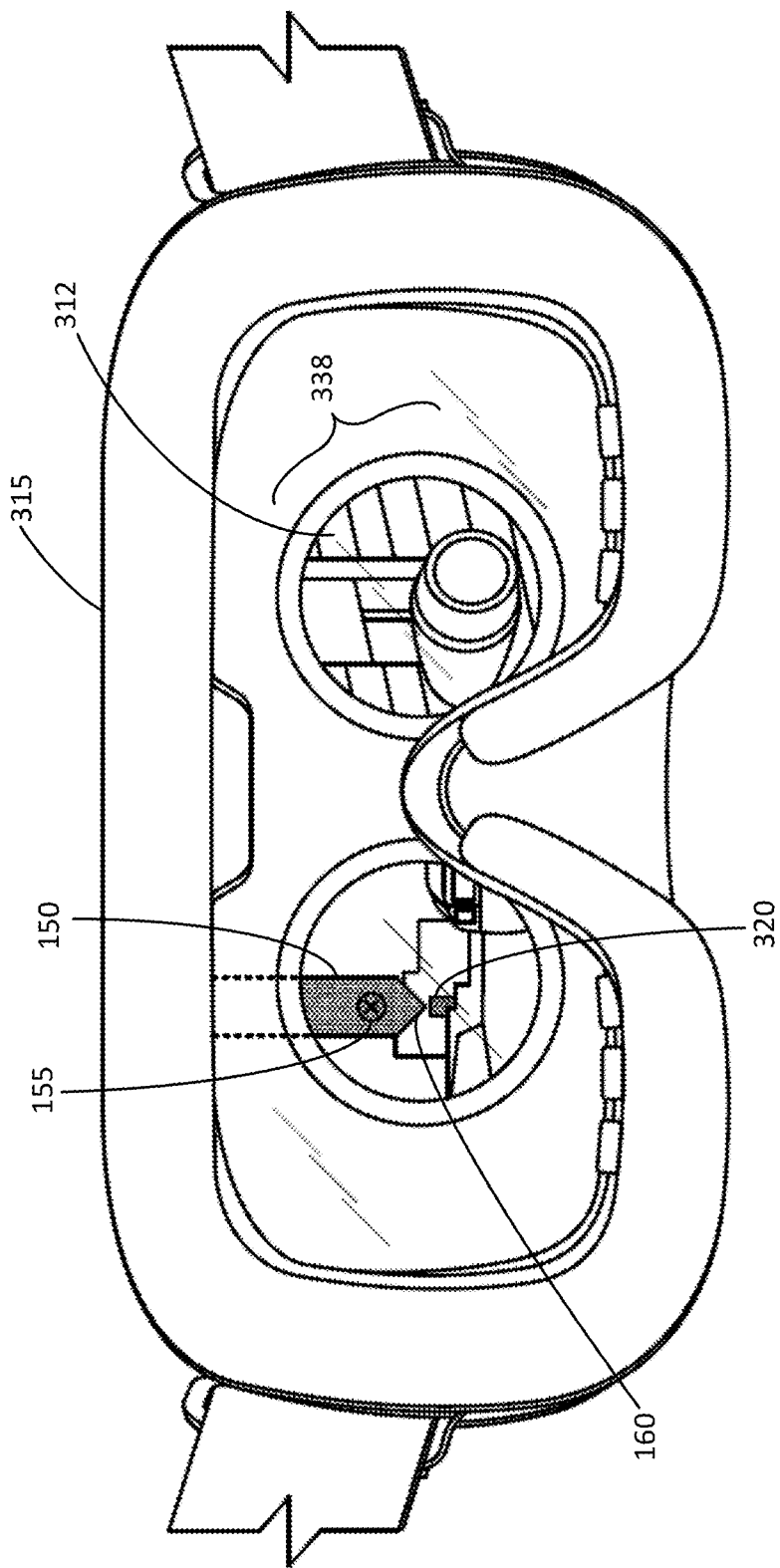
FIG. 3B illustrates a schematic diagram of headgear of the virtual reality system of FIG. 3A in which the headgear displays a pinpoint bookmark in accordance with various embodiments of the present inventive concept.

FIG. 3B illustrates a schematic diagram of headgear of the virtual reality system of FIG. 3A in which the headgear displays a pinpoint bookmark in accordance with various embodiments of the present inventive concept. Reference is now made to FIGS. 1B, 3A, and 3B.

The digital content 338 can be displayed on the display screen 312. The pinpoint bookmark 150 can be translucent and elongated, and can include a termination point 160 that points directly to a highlighted target virtual reality object 320. The virtual reality object 320 can be any object of interest to the user that is viewable on the display screen 312. The virtual reality object 320 can exist within a metaverse. The pinpoint bookmark control logic section 115 can automatically reposition and/or re-size the pinpoint bookmark 150 and the highlighted target object 320 on the display screen 312 and keep them correctly positioned relative to each other even if other elements shown on the display screen 312 are repositioned or re-sized. The local save pinpoint bookmark logic section 196 of the pinpoint bookmark control logic section 115 can cause the pinpoint bookmark 150 and associated metadata to be stored locally in the non-volatile memory 120 and/or the volatile memory 125. The local retrieve pinpoint bookmark logic section 198 of the pinpoint bookmark control logic section 115 can cause the pinpoint bookmark 150 and associated metadata to be retrieved locally from the non-volatile memory 120 and/or the volatile memory 125, so that it can be displayed on the display screen 312 when the user wishes to return.

For example, the user can access the pinpoint bookmark list (e.g., 190 of FIG. 1A) using the pinpoint bookmark list manager logic section 199, and select a particular pinpoint bookmark (e.g., 150) from the list 190 to which the user would like to return. The bookmark list manager logic section 199 can then cause the digital content 338 having that particular pinpoint bookmark 150 to be displayed on the display screen 312 with the pinpoint bookmark 150 pointing to a specific location (e.g., virtual reality object 320) within the digital content 338.

The pinpoint bookmark 150 can include a close button or icon 155. In response to the user selecting the close button or icon 155 using the virtual reality hand controller 328 (or voice command, etc.), the pinpoint bookmark 150 can be removed from the display screen 312 and/or deleted by the pinpoint bookmark control logic section 115 from the non-volatile memory 120 and/or the volatile memory 125.

To place a new pinpoint bookmark, the user can highlight a virtual reality object (e.g., 320) within the virtual reality digital content 338, and select a pinpoint bookmark creation button or icon (not shown), which can cause the pinpoint bookmark 150 to appear overlaying the digital content 338 and pointing directly to the highlighted virtual reality object 320. In addition, the local save pinpoint bookmark logic section 196 of the pinpoint bookmark control logic section 115 can cause the pinpoint bookmark 150 and associated metadata to be saved to the non-volatile memory 120 and/or the volatile memory 125. The user can invoke a pinpoint bookmark creation button or icon (not shown) using the virtual reality hand controller 328, a voice command, or the like. Moreover, the pinpoint bookmark list manager logic section 199 can add a link to the pinpoint bookmark 150 to the pinpoint bookmark list 190.

Figure 4A:
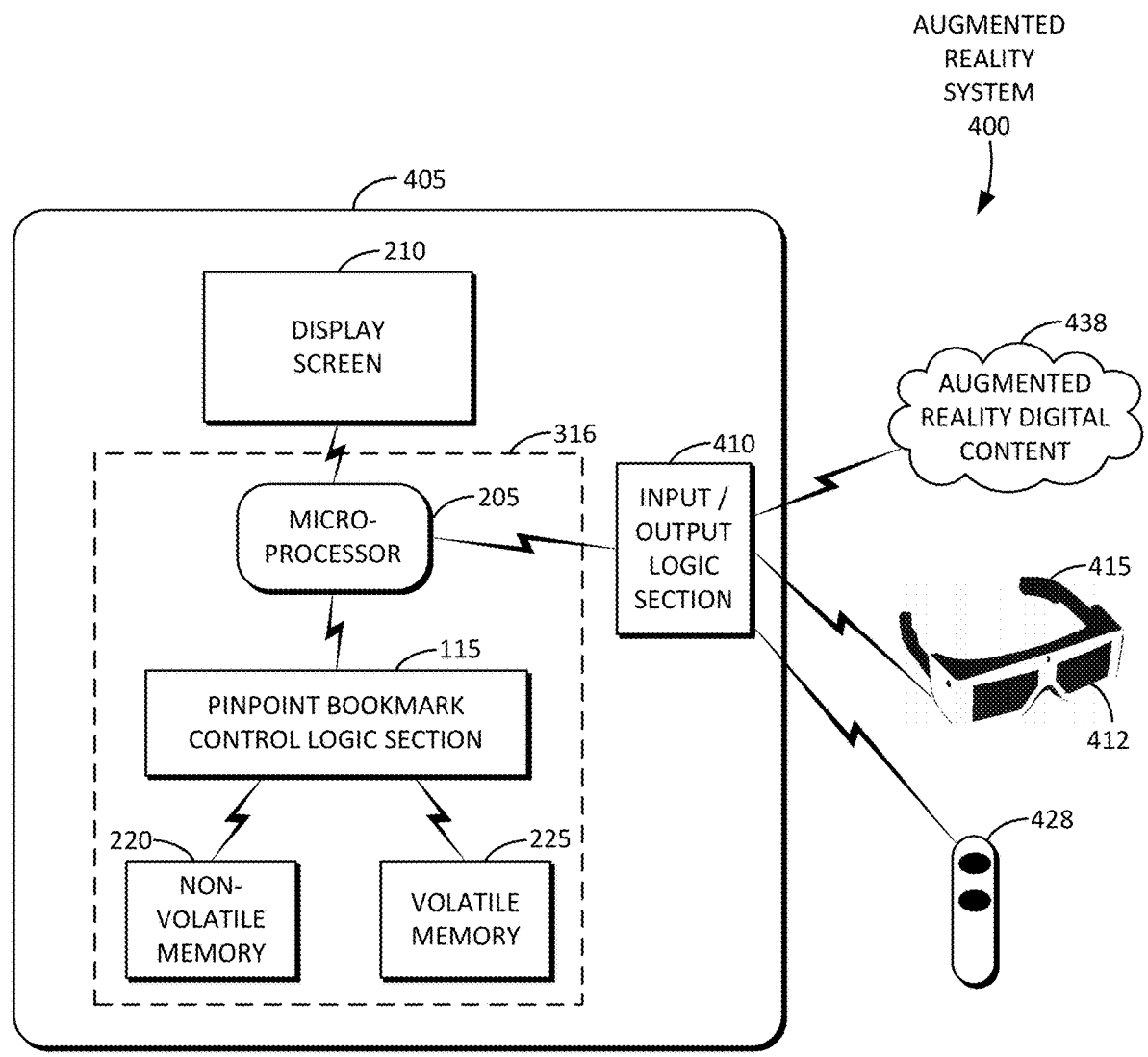
FIG. 4A illustrates a block diagram of an example augmented reality system including a pinpoint bookmark control logic section in accordance with various embodiments of the present inventive concept.

FIG. 4A illustrates a block diagram of an example augmented reality system 400 including a pinpoint bookmark control logic section 115 in accordance with various embodiments of the present inventive concept.

The augmented reality system 400 can include smart glasses 415, an augmented reality hand controller 428, and a digital computing device 405. The digital computing device 405 can be a desktop computer separate from the smart glasses 415, a smart phone attached to the smart glasses 415, a mobile computer embedded within the smart glasses 415, or the like. The smart glasses 415 can include a display screen 412. The augmented reality hand controller 428 can manipulate or select items that are viewable in the smart glasses 415 to the user. The digital computing device 405 can include integrated circuit devices 316 such as a microprocessor 205, a non-volatile memory 220, a volatile memory 225, and the pinpoint bookmark control logic section 115. The pinpoint bookmark control logic section 115 can include computer logic, computer code, or the like, which may be executed by the microprocessor 205. In some embodiments, the pinpoint bookmark control logic section 115 is stored in the non-volatile memory 220 and/or the volatile memory 225.

In a first mode, the display screen 412 can display a pinpoint bookmark list (e.g., 190 of FIG. 1A). The pinpoint bookmark list 412 can show a list of previously bookmarked locations. The user can select a previously bookmarked location from the pinpoint bookmark list 412. For example, the user can grasp the augmented reality hand controller 428 and select one of the previously bookmarked locations from the pinpoint bookmark list 190. In response to the selection, a second mode can be initiated in which the pinpoint bookmark control logic section 115 can cause the display screen 412 to jump to the digital content 438 with which the selected bookmark is associated, and cause the display screen 412 to overlay a pinpoint bookmark 150 atop the digital content 438. The pinpoint bookmark 150 can point to a specific location within the digital content 438, such as to a real object in an augmented reality environment, a virtual object in the augmented reality environment, a letter, a word, an image, or the like. The digital content 438 can include, for example, augmented reality content, a webpage, an email, a video, an audio clip, or the like, as further described below.

Figure 4B:
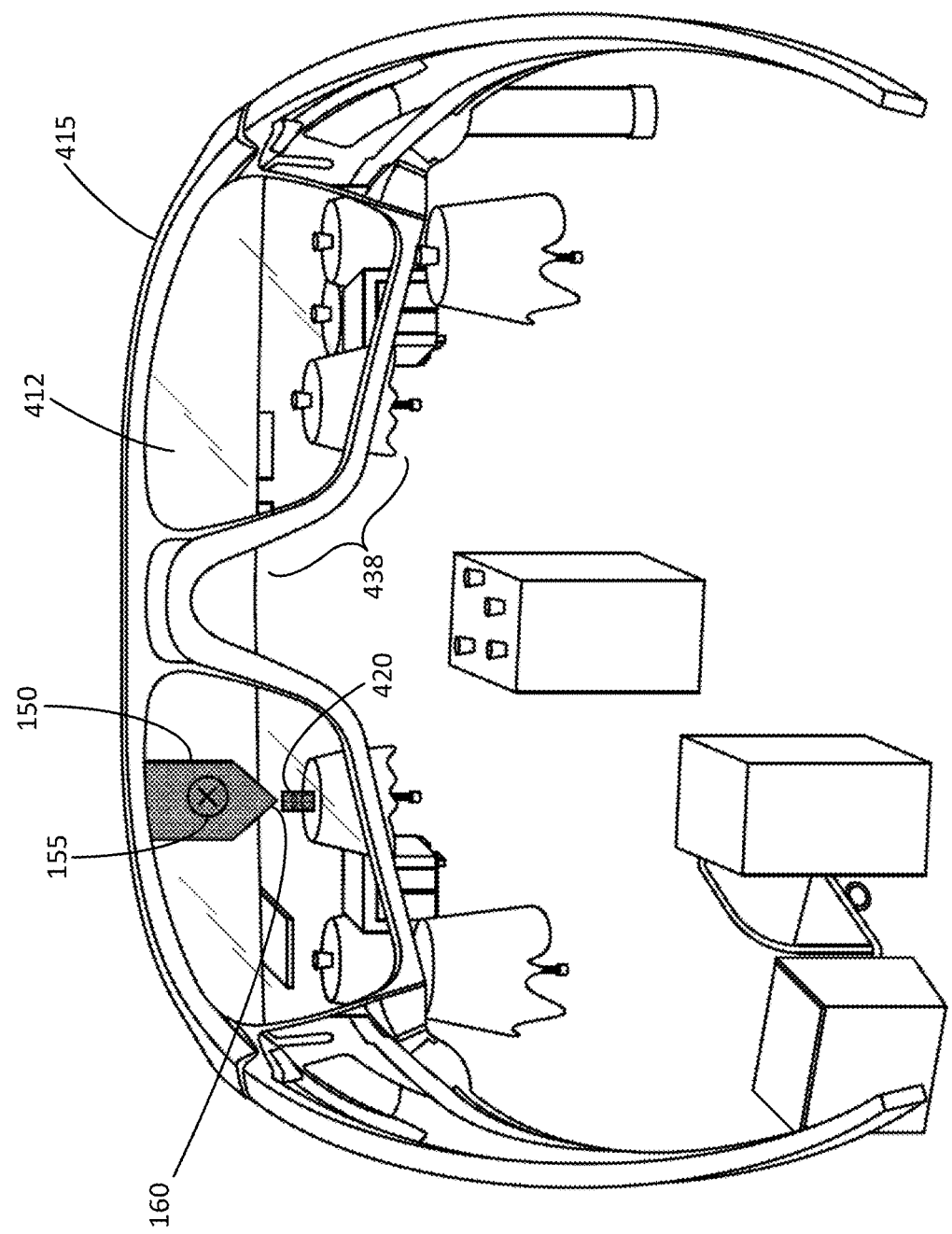
FIG. 4B illustrates a schematic diagram of smart glasses of the augmented reality system of FIG. 4A in which the smart glasses display a pinpoint bookmark in accordance with various embodiments of the present inventive concept.

FIG. 4B illustrates a schematic diagram of smart glasses of the augmented reality system of FIG. 4A in which the smart glasses display a pinpoint bookmark in accordance with various embodiments of the present inventive concept. Reference is now made to FIGS. 1B, 4A, and 4B.

The digital content 438 can be displayed on the display screen 412. The pinpoint bookmark 150 can be translucent and elongated, and can include a termination point 160 that points directly to a highlighted target object 420 in an augmented reality environment. The highlighted target object 420 can be (i) a real object in the augmented reality environment, (ii) a virtual object in the augmented reality environment, or (iii) a combination of a real object and a virtual object in the augmented reality environment. The object 420 can be any object of interest to the user that is viewable on the display screen 412. The pinpoint bookmark control logic section 115 can automatically reposition and/or re-size the pinpoint bookmark 150 and the highlighted object 420 on the display screen 412 and keep them correctly positioned relative to each other even if other elements shown on the display screen 412 are repositioned or re-sized. The local save pinpoint bookmark logic section 196 of the pinpoint bookmark control logic section 115 can cause the pinpoint bookmark 150 and associated metadata to be stored locally in the non-volatile memory 120 and/or the volatile memory 125. The local retrieve pinpoint bookmark logic section 198 of the pinpoint bookmark control logic section 115 can cause the pinpoint bookmark 150 and associated metadata to be retrieved locally from the non-volatile memory 120 and/or the volatile memory 125, so that it can be displayed on the display screen 412 when the user wishes to return.

For example, the user can access the pinpoint bookmark list (e.g., 190 of FIG. 1A) using the pinpoint bookmark list manager logic section 199, and select a particular pinpoint bookmark (e.g., 150) from the list 190 to which the user would like to return. The bookmark list manager logic section 199 can then cause the digital content 438 having that particular pinpoint bookmark 150 to be displayed on the display screen 412 with the pinpoint bookmark 150 pointing to a specific location (e.g., object 420) within the digital content 438.

The pinpoint bookmark 150 can include a close button or icon 155. In response to the user selecting the close button or icon 155 using the augmented reality hand controller 428 (or voice command, etc.), the pinpoint bookmark 150 can be removed from the display screen 412 and/or deleted by the pinpoint bookmark control logic section 115 from the non-volatile memory 120 and/or the volatile memory 125.

To place a new pinpoint bookmark, the user can highlight an object (e.g., 420) within the augmented reality digital content 438, and select a pinpoint bookmark creation button or icon (not shown) or using a voice command, which can cause the pinpoint bookmark 150 to appear overlaying the digital content 438 and pointing directly to the highlighted object 420. In addition, the local save pinpoint bookmark logic section 196 of the pinpoint bookmark control logic section 115 can cause the pinpoint bookmark 150 and associated metadata to be saved to the non-volatile memory 120 and/or the volatile memory 125. The user can invoke a pinpoint bookmark creation button or icon (not shown) using the augmented reality hand controller 428, a voice command, or the like. Moreover, the pinpoint bookmark list manager logic section 199 can add a link to the pinpoint bookmark 150 to the pinpoint bookmark list 190.

Figure 5:
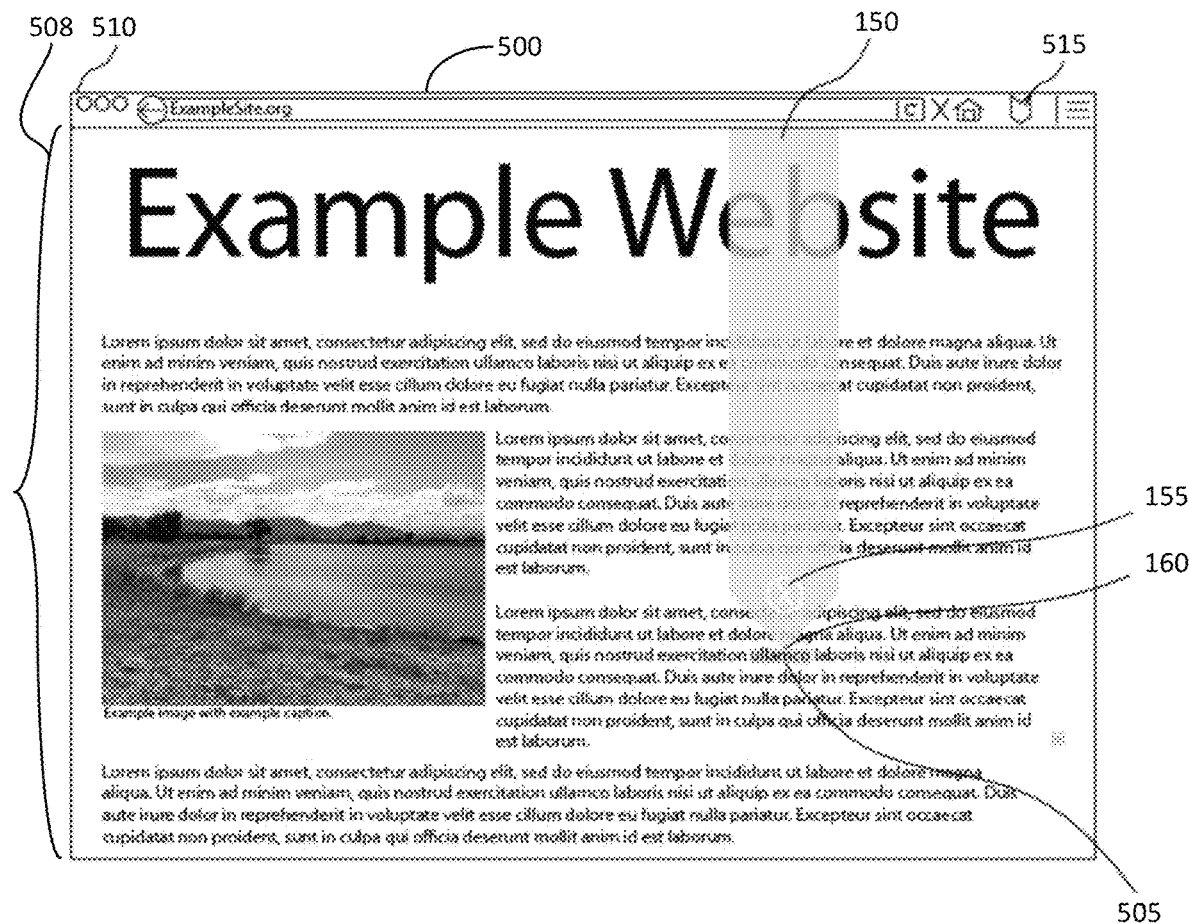
FIG. 5 illustrates a schematic diagram of an example website in which an overlaying translucent pinpoint bookmark points to a specific word in accordance with various embodiments of the present inventive concept.

FIG. 5 illustrates a schematic diagram of an example website in which an overlaying translucent pinpoint bookmark 150 points to a specific word 505 in accordance with various embodiments of the present inventive concept. The example embodiments described below are applicable to any of the embodiments described above with reference to FIGS. 1A, 1B, 2A, 3A, 4A, and 5. Reference is now made to FIGS. 1A, 1B, 2A, 3A, 4A, and 5.

The digital content 508 can be displayed on a display screen (e.g., 110). The pinpoint bookmark 150 can be translucent and elongated, and can include a termination point 160 that points directly to a highlighted target word 505. The local save pinpoint bookmark logic section 196 of the pinpoint bookmark control logic section 115 can cause the pinpoint bookmark 150 and associated metadata to be stored locally in the non-volatile memory 120 and/or the volatile memory 125. The local retrieve pinpoint bookmark logic section 198 of the pinpoint bookmark control logic section 115 can cause the pinpoint bookmark 150 and associated metadata to be retrieved locally from the non-volatile memory 120 and/or the volatile memory 125, so that it can be displayed on the display screen (e.g., 110) when the user wishes to return.

For example, the user can access the pinpoint bookmark list 190 using the pinpoint bookmark list manager logic section 199, and select a particular pinpoint bookmark (e.g., 150) from the list 190 to which the user would like to return. The bookmark list manager logic section 199 can then cause the digital content 508 having that particular pinpoint bookmark 150 to be displayed on the display screen (e.g., 110) with the pinpoint bookmark 150 pointing to a specific location (e.g., word 505) within the digital content 508.

The pinpoint bookmark 150 can include a close button or icon 155. In response to the user touching or clicking on the close button or icon 155, the pinpoint bookmark 150 can be removed from the display screen (e.g., 110) and/or deleted by the pinpoint bookmark control logic section 115 from the non-volatile memory 120 and/or the volatile memory 125.

To place a new pinpoint bookmark, the user can highlight a section of the digital content 508 such as the word 505, and press the pinpoint bookmark creation button or icon 515, which can cause the pinpoint bookmark 150 to appear overlaying the digital content 508 and pointing directly to the highlighted word 505. In addition, the local save pinpoint bookmark logic section 196 of the pinpoint bookmark control logic section 115 can cause the pinpoint bookmark 150 and associated metadata to be saved to the non-volatile memory 120 and/or the volatile memory 125. The user can invoke the pinpoint bookmark creation button or icon 515 using a touch gesture, a mouse, a keyboard, or the like. Moreover, the pinpoint bookmark list manager logic section 199 can add a link to the pinpoint bookmark 150 to the pinpoint bookmark list 190.

Figure 6:
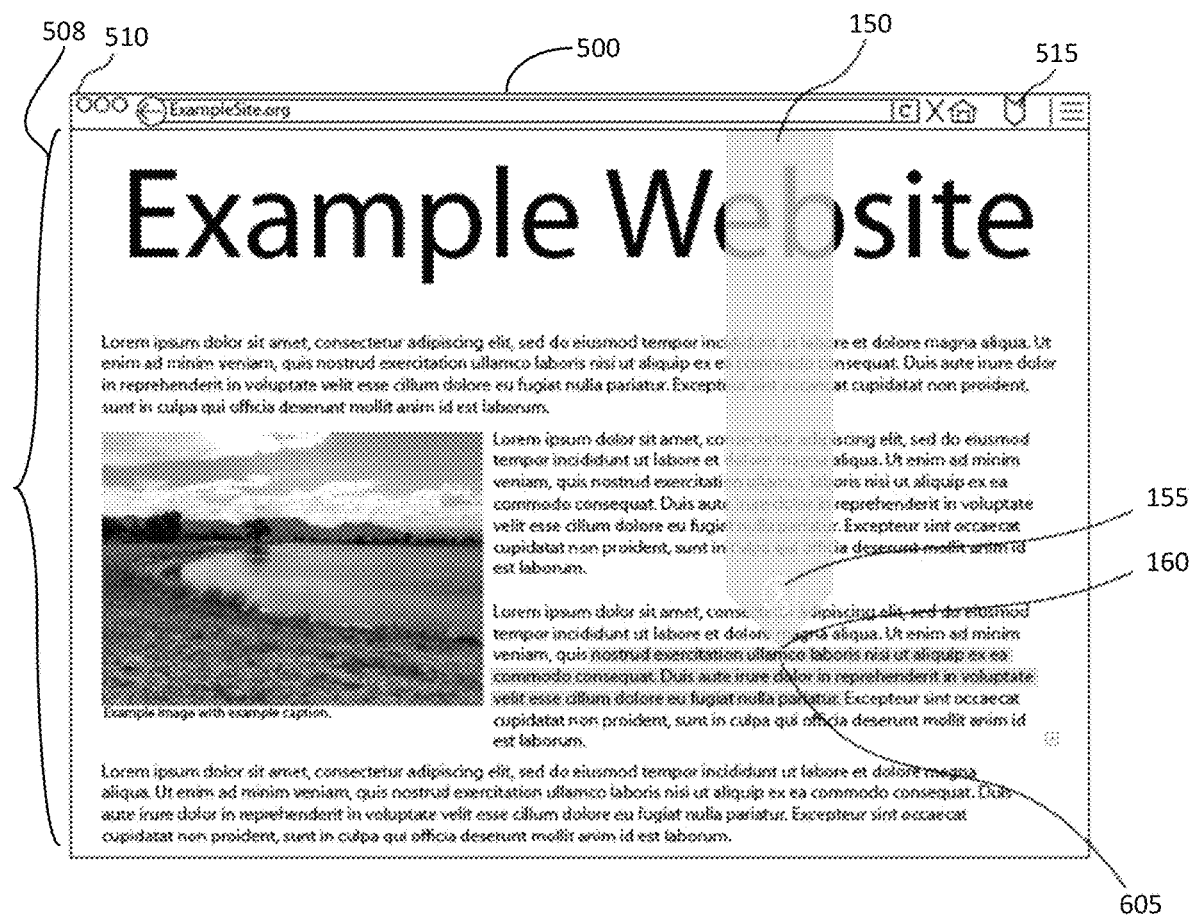
FIG. 6 illustrates a schematic diagram of an example website in which an overlaying translucent pinpoint bookmark points to a specific sentence in accordance with various embodiments of the present inventive concept.

FIG. 6 illustrates a schematic diagram of an example website in which an overlaying translucent pinpoint bookmark 150 points to a specific sentence 605 in accordance with various embodiments of the present inventive concept. Some reference numerals that appear in FIG. 6 have already been described in detail above. Thus, a detailed description of these is not repeated. It will be understood that the functionality of the various embodiments described herein is applicable to the highlighted sentence 605.

Figure 7:
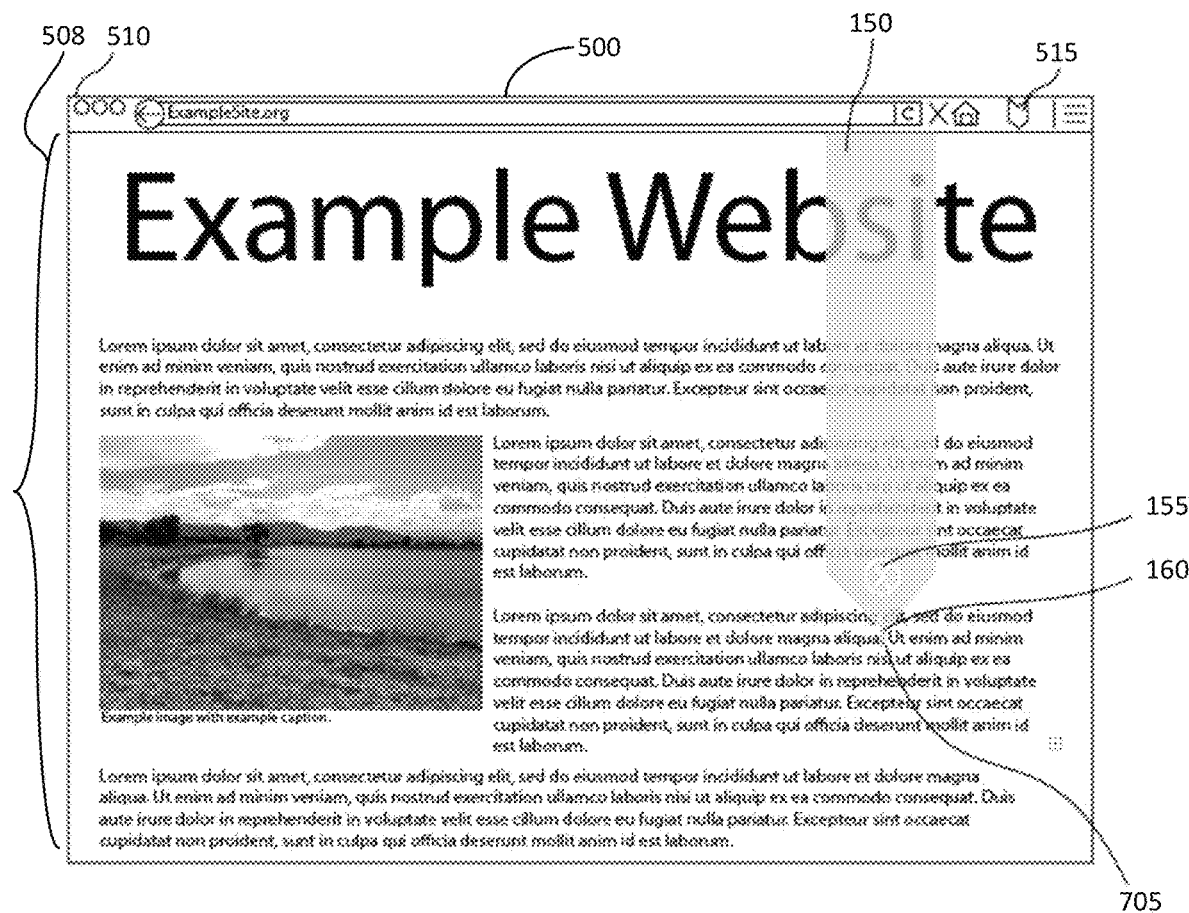
FIG. 7 illustrates a schematic diagram of an example website in which an overlaying translucent pinpoint bookmark points to a specific punctuation mark in accordance with various embodiments of the present inventive concept.

FIG. 7 illustrates a schematic diagram of an example website in which an overlaying translucent pinpoint bookmark 150 points to a specific punctuation mark 705 in accordance with various embodiments of the present inventive concept. Some reference numerals that appear in FIG. 7 have already been described in detail above. Thus, a detailed description of these is not repeated. It will be understood that the functionality of the various embodiments described herein is applicable to the highlighted punctuation mark 705.

Figure 8:
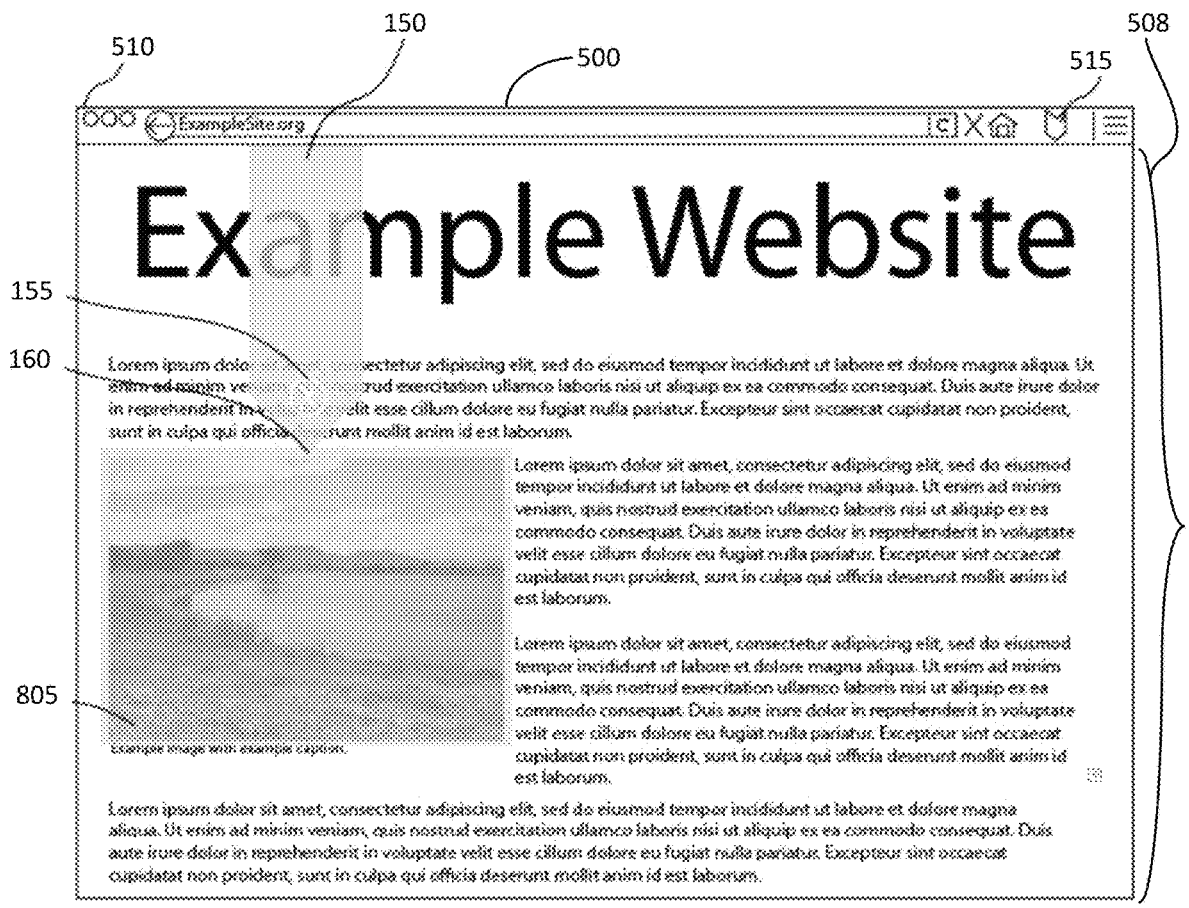
FIG. 8 illustrates a schematic diagram of an example website in which an overlaying translucent pinpoint bookmark points to a specific image in accordance with various embodiments of the present inventive concept.

FIG. 8 illustrates a schematic diagram of an example website in which an overlaying translucent pinpoint bookmark 150 points to a specific image 805 in accordance with various embodiments of the present inventive concept. Some reference numerals that appear in FIG. 8 have already been described in detail above. Thus, a detailed description of these is not repeated. It will be understood that the functionality of the various embodiments described herein is applicable to the highlighted image 805.

Figure 9:
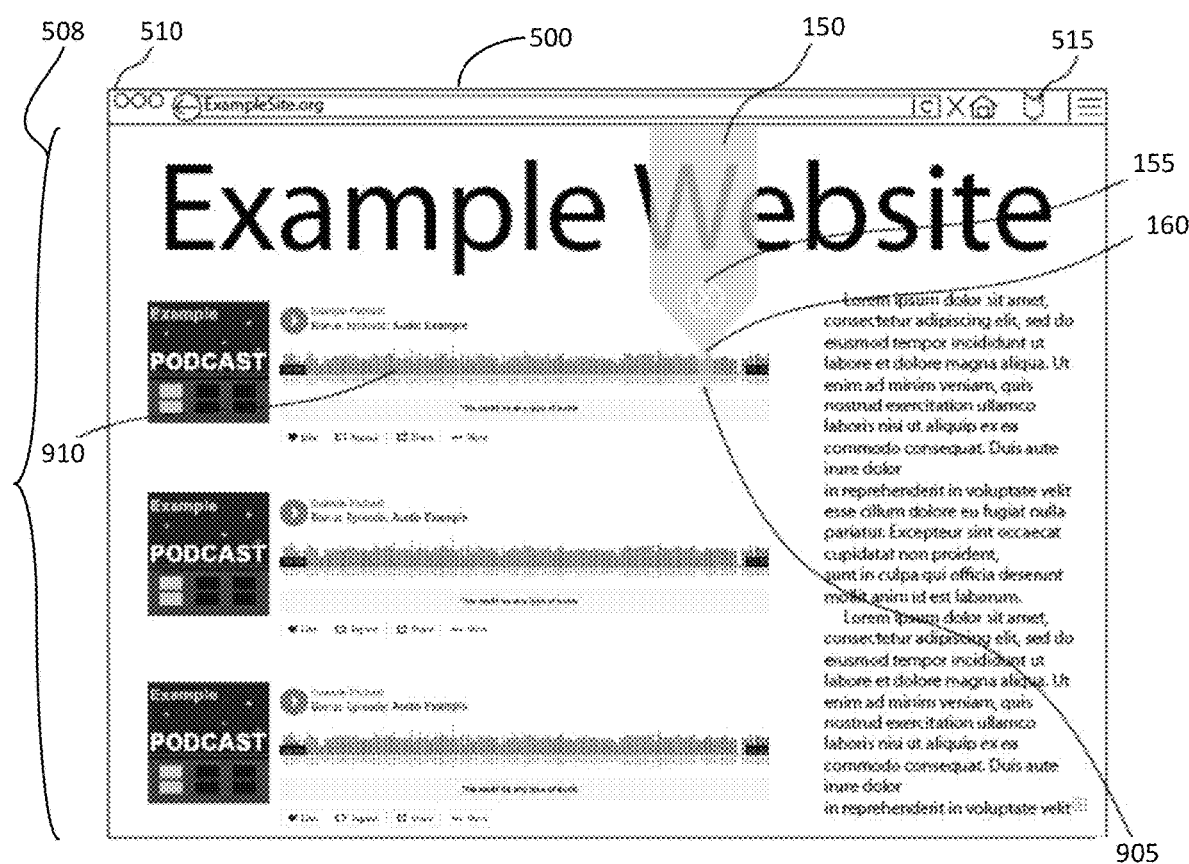
FIG. 9 illustrates a schematic diagram of an example website in which an overlaying translucent pinpoint bookmark points to a specific location on a timeline of an audio stream in accordance with various embodiments of the present inventive concept.

FIG. 9 illustrates a schematic diagram of an example website in which an overlaying translucent pinpoint bookmark 150 points to a specific location 905 on a timeline of an audio stream 910 in accordance with various embodiments of the present inventive concept. Some reference numerals that appear in FIG. 9 have already been described in detail above. Thus, a detailed description of these is not repeated. It will be understood that the functionality of the various embodiments described herein is applicable to the highlighted specific location 905 of the audio stream 910. In other words, the user can place and remove pinpoint bookmarks within an audio stream 910. When the user wishes to return, the user can immediately jump to the specific location 905 in the audio stream 910 by selecting a pinpoint bookmark from the pinpoint bookmark list (e.g., 190 of FIG. 1A).

Figure 10:
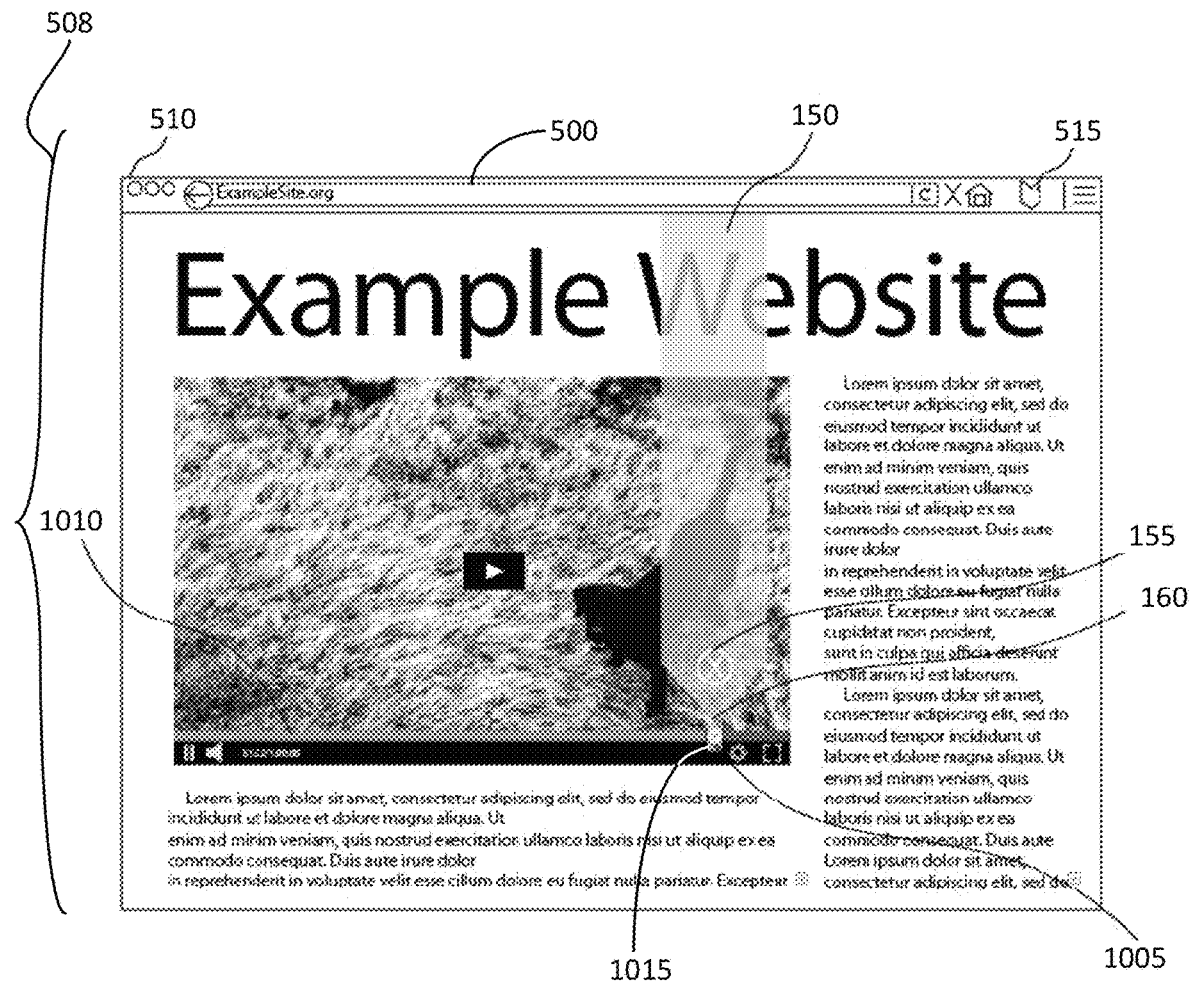
FIG. 10 illustrates a schematic diagram of an example website in which an overlaying translucent pinpoint bookmark points to a specific location on a timeline of a video stream with a progress bar extended in accordance with various embodiments of the present inventive concept.

FIG. 10 illustrates a schematic diagram of an example website in which an overlaying translucent pinpoint bookmark 150 points to a specific location 1005 on a timeline of a video stream 1010 with a progress bar 1015 extended in accordance with various embodiments of the present inventive concept. Some reference numerals that appear in FIG. 10 have already been described in detail above. Thus, a detailed description of these is not repeated. It will be understood that the functionality of the various embodiments described herein is applicable to the highlighted specific location 1005 of the video stream 1010. In other words, the user can place and remove pinpoint bookmarks within a video stream 1010. When the user wishes to return, the user can immediately jump to the specific location 1005 in the video stream 1010 by selecting a pinpoint bookmark from the pinpoint bookmark list (e.g., 190 of FIG. 1A).

Figure 11:
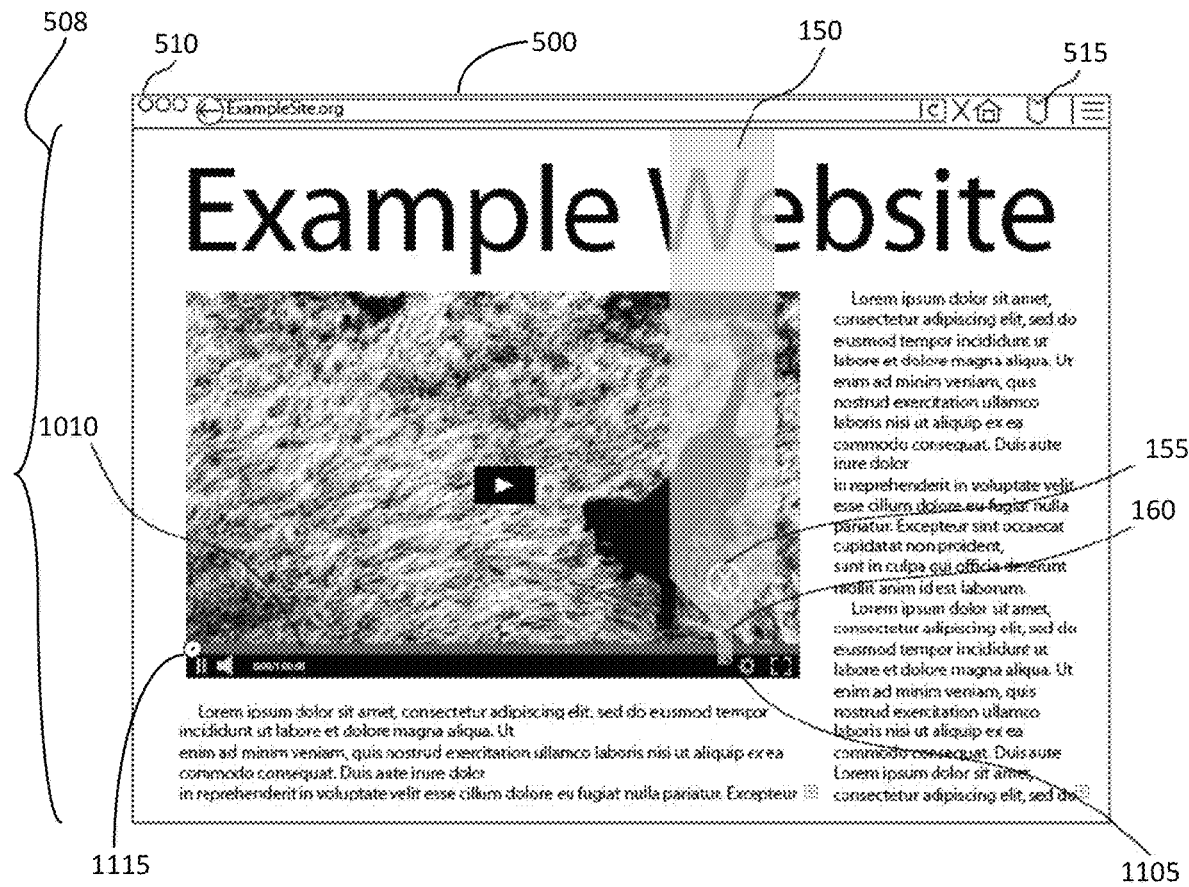
FIG. 11 illustrates a schematic diagram of an example website in which an overlaying translucent pinpoint bookmark points to a specific location on a timeline of a video stream with the progress bar not extended in accordance with various embodiments of the present inventive concept.

FIG. 11 illustrates a schematic diagram of an example website in which an overlaying translucent pinpoint bookmark 150 points to a specific location 1105 on a timeline of a video stream 1010 with the progress bar 1115 not extended in accordance with various embodiments of the present inventive concept. Some reference numerals that appear in FIG. 11 have already been described in detail above. Thus, a detailed description of these is not repeated. It will be understood that the functionality of the various embodiments described herein is applicable to the highlighted specific location 1105 of the video stream 1010. In other words, the user can place and remove pinpoint bookmarks within a video stream 1010. When the user wishes to return, the user can immediately jump to the specific location 1105 in the video stream 1010 by selecting a pinpoint bookmark from the pinpoint bookmark list (e.g., 190 of FIG. 1A).

Figure 12:
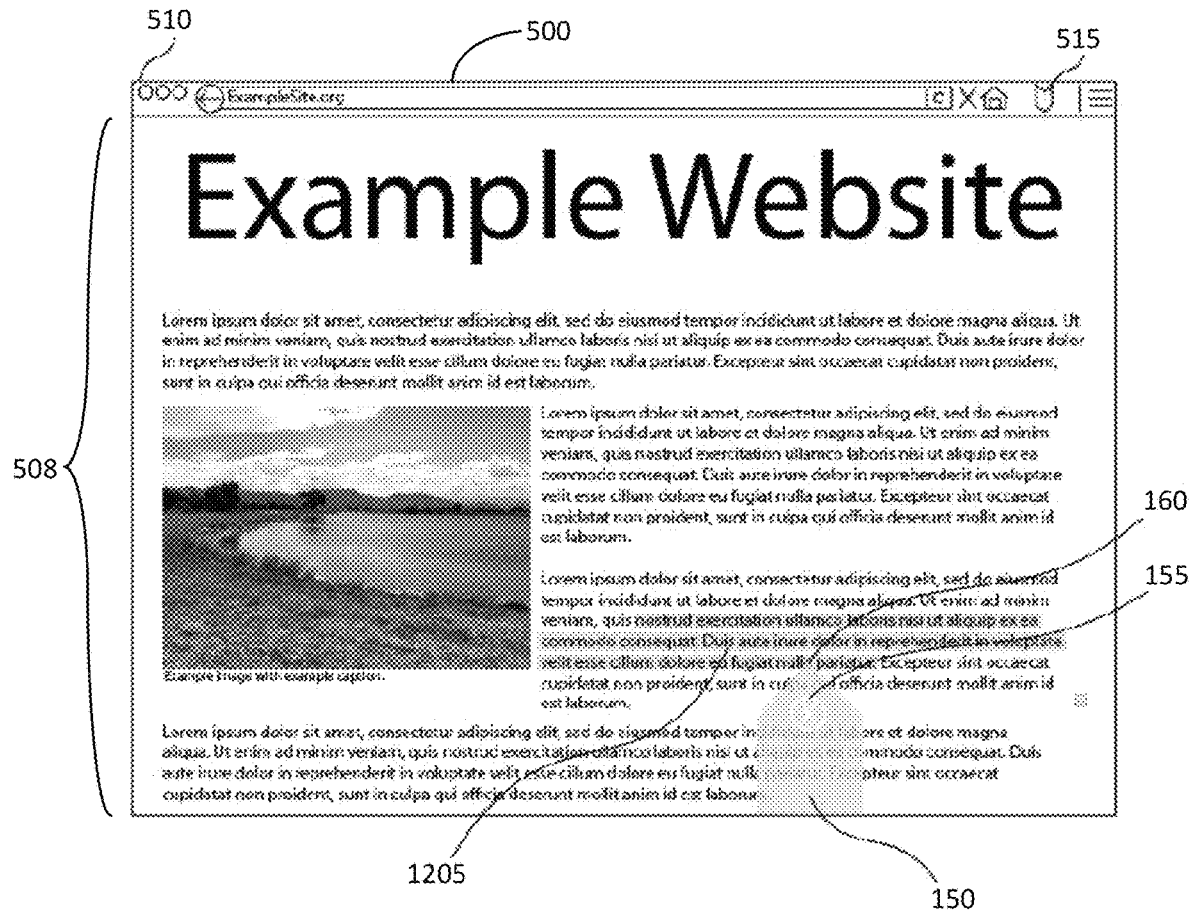
FIG. 12 illustrates a schematic diagram of an example website in which an overlaying translucent pinpoint bookmark extends from a bottom edge of the display screen and points to a specific section of a paragraph in accordance with various embodiments of the present inventive concept.

FIG. 12 illustrates a schematic diagram of an example website in which an overlaying translucent pinpoint bookmark 150 extends from a bottom edge of the display screen (e.g., 110, 210, etc.) and points to a specific section 1205 of a paragraph in accordance with various embodiments of the present inventive concept. Some reference numerals that appear in FIG. 12 have already been described in detail above. Thus, a detailed description of these is not repeated. It will be understood that the functionality of the various embodiments described herein is applicable to the upward pointing pinpoint bookmark 150 and the highlighted section 1205.

Figure 13:
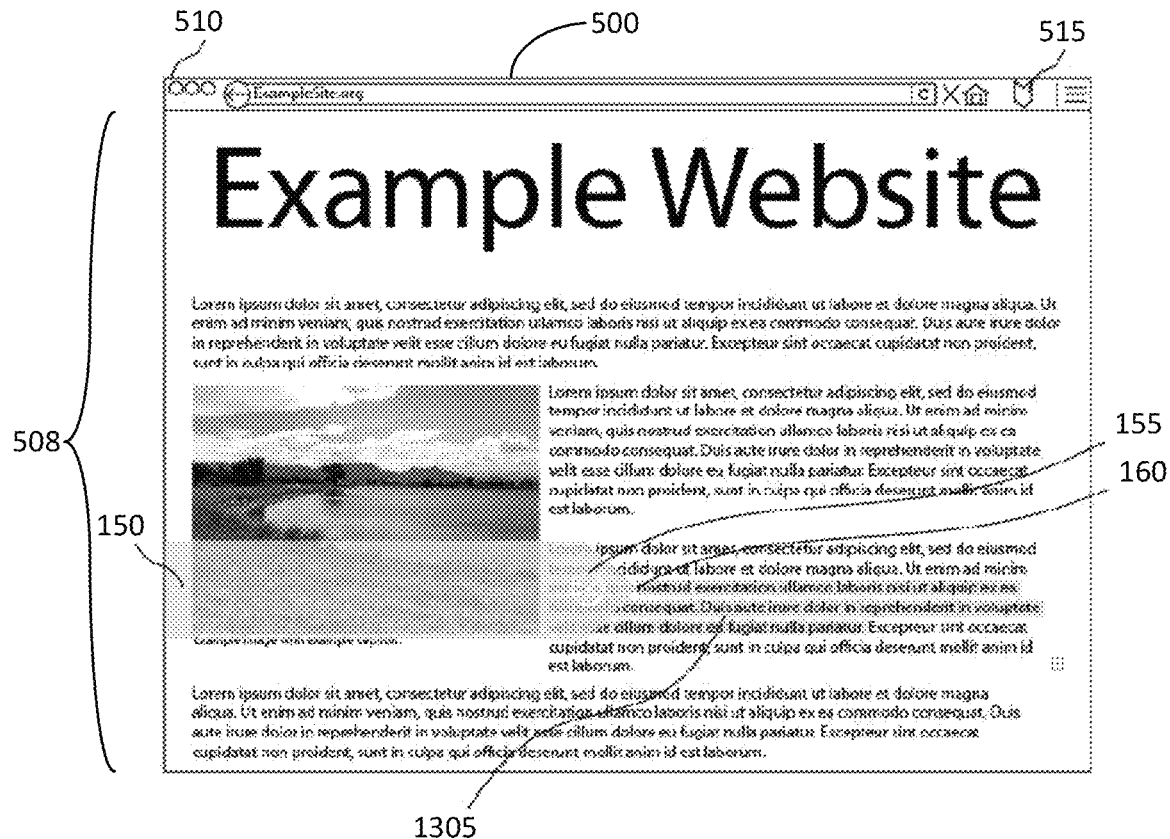
FIG. 13 illustrates a schematic diagram of an example website in which an overlaying translucent pinpoint bookmark extends from a left edge of the display screen and points to a specific section of a paragraph in accordance with various embodiments of the present inventive concept.

FIG. 13 illustrates a schematic diagram of an example website in which an overlaying translucent pinpoint bookmark 150 extends from a left edge of the display screen (e.g., 110, 210, etc.) and points to a specific section 1305 of a paragraph in accordance with various embodiments of the present inventive concept. Some reference numerals that appear in FIG. 13 have already been described in detail above. Thus, a detailed description of these is not repeated. It will be understood that the functionality of the various embodiments described herein is applicable to the rightward pointing pinpoint bookmark 150 and the highlighted section 1305. Alternatively, the translucent pinpoint bookmark 150 can extend diagonally (not shown) from the top, bottom, left, or right edge of the display screen (e.g., 110, 210, etc.).

Figure 14:
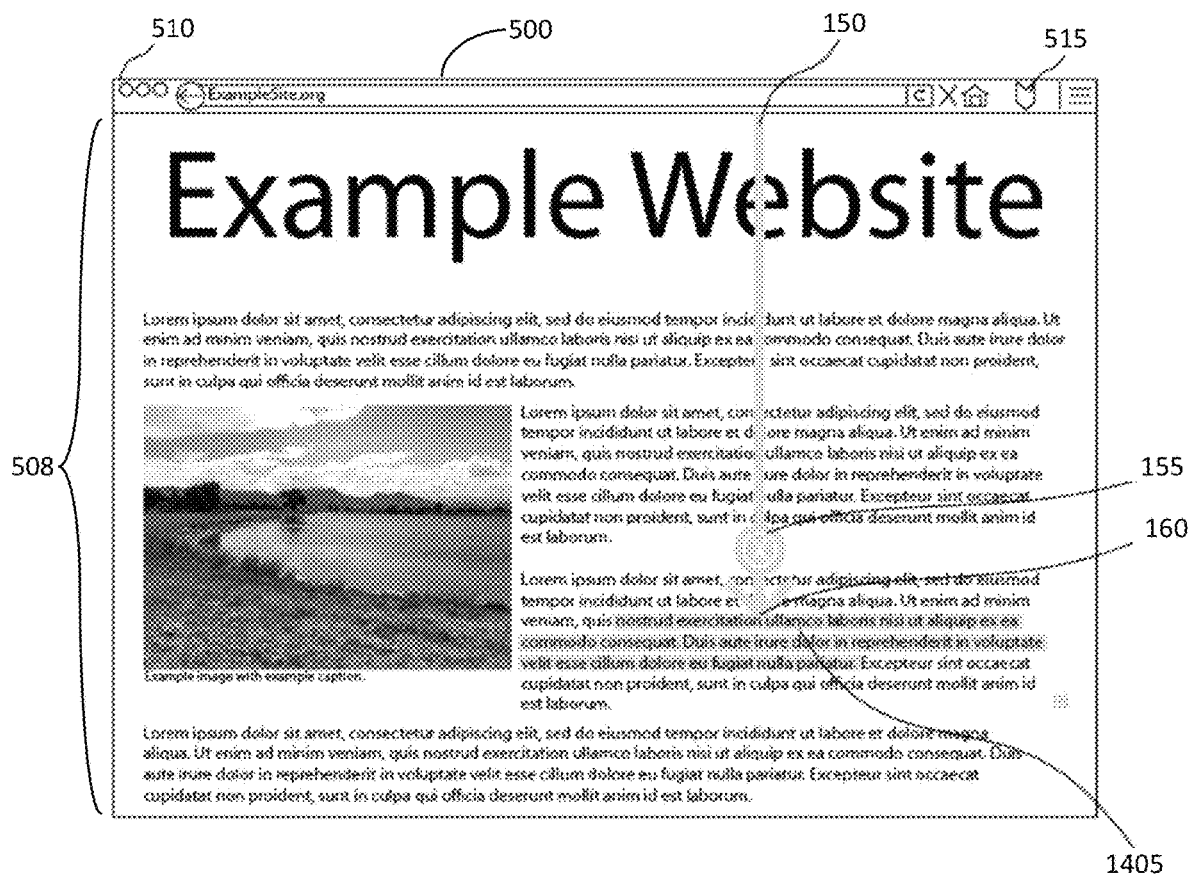
FIG. 14 illustrates a schematic diagram of an example website in which an overlaying opaque narrow pinpoint bookmark extends from a top edge of the display screen and points to a specific section of a paragraph in accordance with various embodiments of the present inventive concept.

FIG. 14 illustrates a schematic diagram of an example website in which an overlaying opaque narrow pinpoint bookmark 150 extends from a top edge of the display screen (e.g., 110, 210, etc.) and points to a specific section 1405 of a paragraph in accordance with various embodiments of the present inventive concept. Since it is narrow, the digital content 508 is not obstructed in any significant way and is still mostly visible notwithstanding the pinpoint bookmark 150. Some reference numerals that appear in FIG. 14 have already been described in detail above. Thus, a detailed description of these is not repeated. It will be understood that the functionality of the various embodiments described herein is applicable to the opaque narrow pinpoint bookmark 150 and the highlighted section 1405. It will also be understood that the opaque narrow pinpoint bookmark 150 can extend from the top, bottom, left, or right edge of the display screen (e.g., 110, 210, etc.). Alternatively, the opaque narrow pinpoint bookmark 150 can extend diagonally (not shown) from the top, bottom, left, or right edge of the display screen (e.g., 110, 210, etc.).

Figure 15:
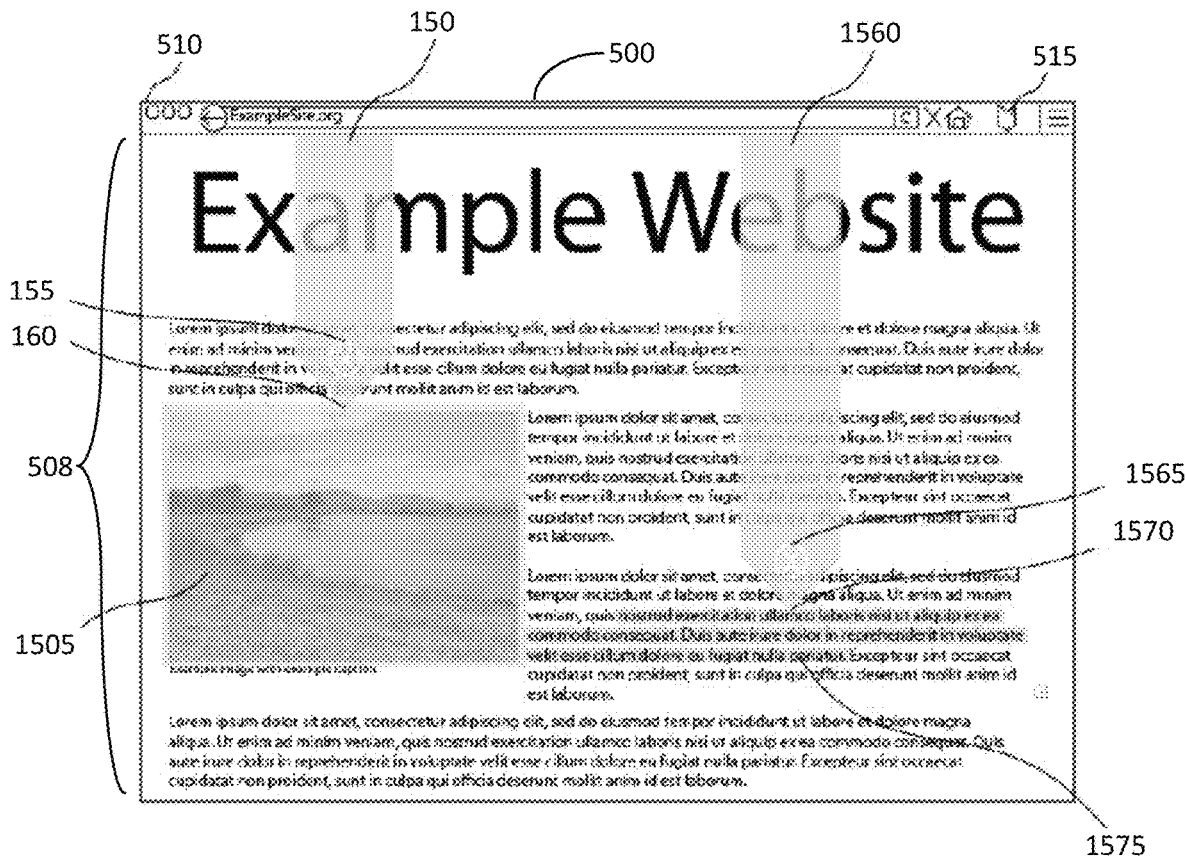
FIG. 15 illustrates a schematic diagram of an example website in which a first overlaying translucent pinpoint bookmark extends from a top edge of the display screen and points to a specific section of a paragraph, and a second overlaying translucent pinpoint bookmark extends from the top edge of the display screen and points to a specific image in accordance with various embodiments of the present inventive concept.

FIG. 15 illustrates a schematic diagram of an example website in which a first overlaying translucent pinpoint bookmark 1560 extends from a top edge of the display screen (e.g., 110, 210, etc.) and points to a specific section 1575 of a paragraph, and a second overlaying translucent pinpoint bookmark 150 extends from the top edge of the display screen (e.g., 110, 210, etc.) and points to a specific image 1505 in accordance with various embodiments of the present inventive concept. The close button or icon 1565 operates similarly to the close button or icon 155. The termination point 1570 operates similarly to the termination point 160. Some reference numerals that appear in FIG. 15 have already been described in detail above. Thus, a detailed description of these is not repeated. It will be understood that the functionality of the various embodiments described herein is applicable to the translucent pinpoint bookmarks 150 and 1560, and to the highlighted sections 1505 and 1575.

Figure 16:
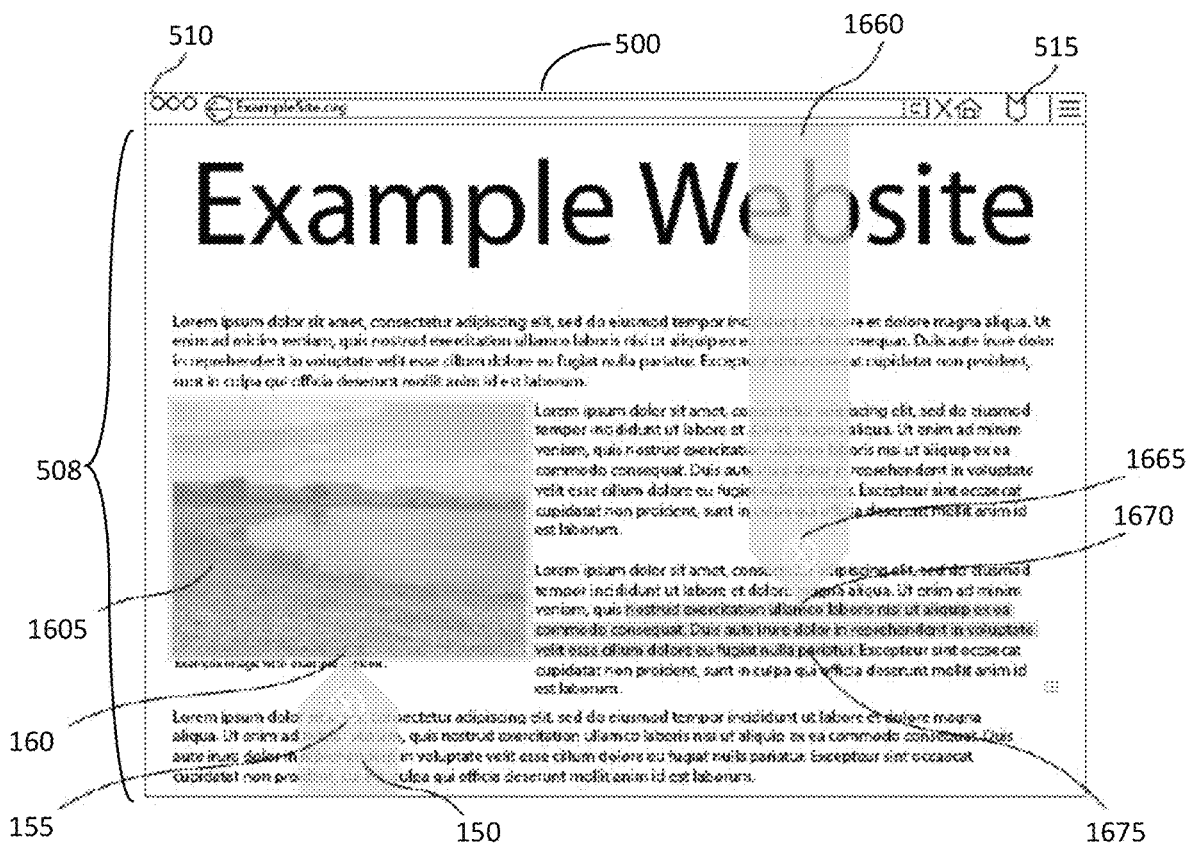
FIG. 16 illustrates a schematic diagram of an example website in which a first overlaying translucent pinpoint bookmark extends from a top edge of the display screen and points to a specific section of a paragraph, and a second overlaying translucent pinpoint bookmark extends from a bottom edge of the display screen and points to a specific image in accordance with various embodiments of the present inventive concept.

FIG. 16 illustrates a schematic diagram of an example website in which a first overlaying translucent pinpoint bookmark 1660 extends from a top edge of the display screen (e.g., 110, 210, etc.) and points to a specific section 1675 of a paragraph, and a second overlaying translucent pinpoint bookmark 150 extends from a bottom edge of the display screen (e.g., 110, 210, etc.) and points to a specific image 1605 in accordance with various embodiments of the present inventive concept. It will be understood that the functionality of the various embodiments described herein is applicable to the translucent pinpoint bookmarks 150 and 1660, and to the highlighted sections 1605 and 1675. Alternatively, the translucent narrow pinpoint bookmarks 150 and 1660 can each extend diagonally (not shown) from the top, bottom, left, or right edge of the display screen (e.g., 110, 210, etc.).

Figure 17:
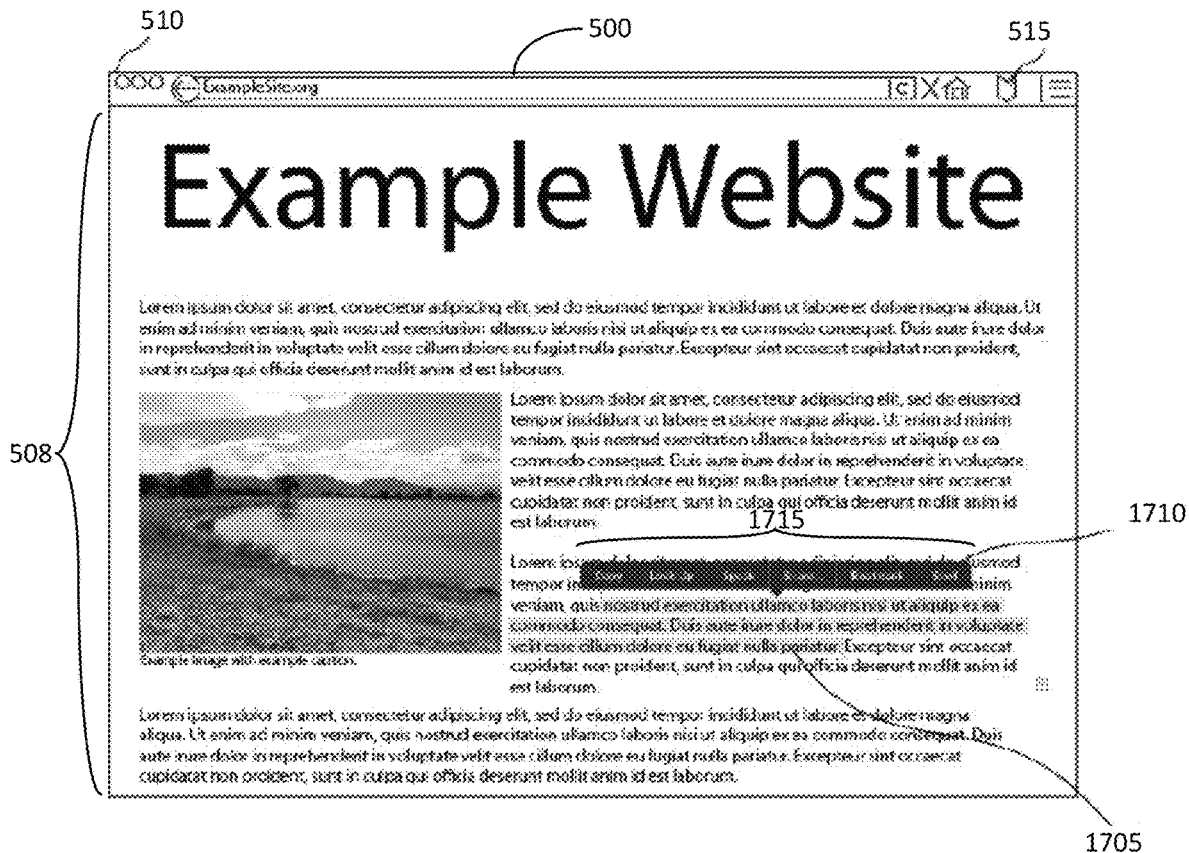
FIG. 17 illustrates a schematic diagram of an example website including an overlaying menu that is displayed on the display screen having one or more options or sub-options for invoking one or more pinpoint bookmarking functions in accordance with various embodiments of the present inventive concept.

FIG. 17 illustrates a schematic diagram of an example website including an overlaying menu 1710 that is displayed on the display screen (e.g., 110, 210, etc.) having one or more options 1715 or sub-options (not shown) for invoking one or more pinpoint bookmarking functions in accordance with various embodiments of the present inventive concept. The one or more options 1715 can include a "Bookmark" option and a "Share" option. The Bookmark option can invoke the creation of a pinpoint bookmark (e.g., 150 of FIG. 1C) that overlays the digital content 508 and points specifically to the highlighted section 1705 of the digital content 508. The Share option enables a user to share the pinpoint bookmark (e.g., 150 of FIG. 1C) with a different user (e.g., friend). The different user can then access the pinpoint bookmark (e.g., 150 of FIG. 1C) using their own computing device such as a smart phone, tablet, or computer. In some embodiments, the bookmarking functions are invoked using a voice command from the user. In the case of a voice command, the pinpoint bookmark control logic section 115 can perform the function in response to the voice command, such as the creation or removal of a pinpoint bookmark. For example, the user can audibly state "create pinpoint bookmark," "set pinpoint bookmark," "set bookmark," or the like to cause the pinpoint bookmark to be created and set to the specific highlighted section.

Figure 18:
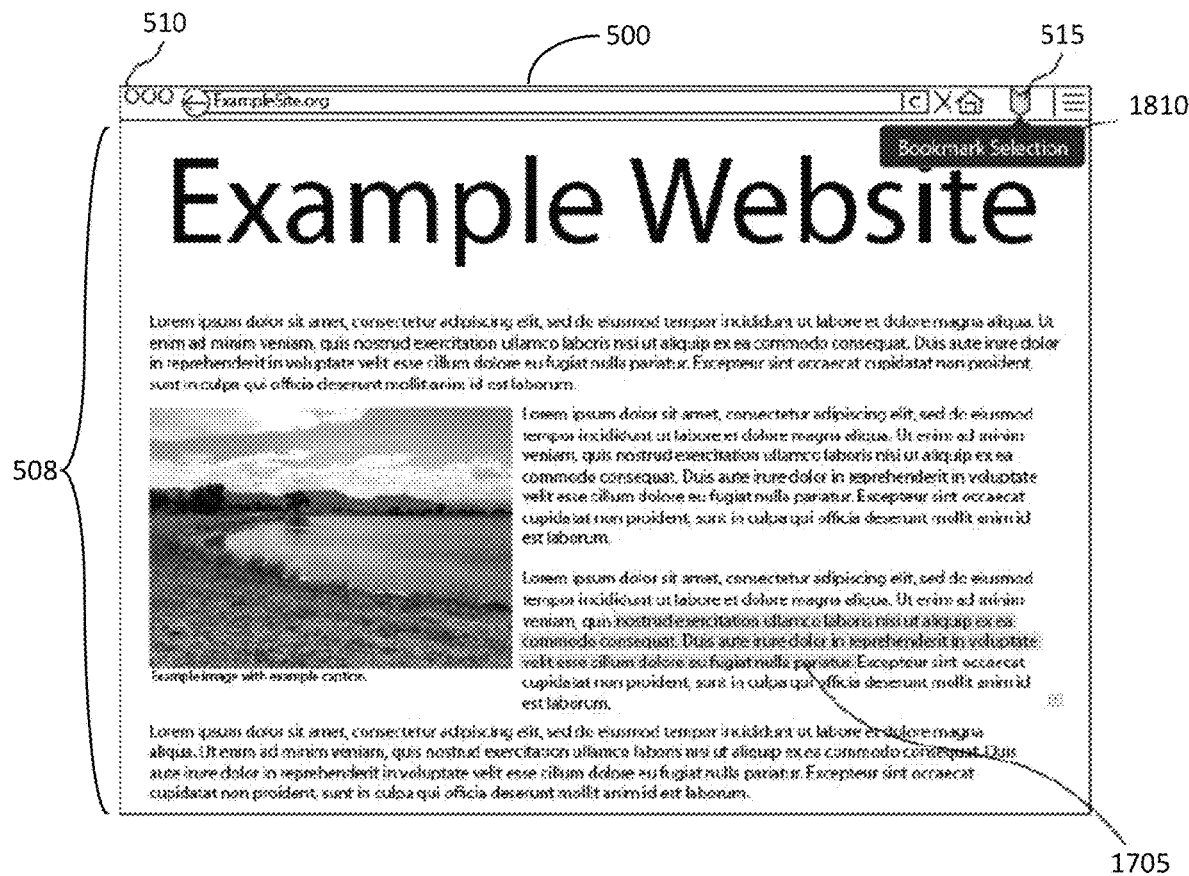
FIG. 18 illustrates a schematic diagram of an example website including a title bar bookmark selection icon that is displayed on the display screen for invoking a pinpoint bookmarking function in accordance with various embodiments of the present inventive concept.

FIG. 18 illustrates a schematic diagram of an example website including a title bar bookmark selection icon 1810 that is displayed on the display screen (e.g., 110, 210, etc.) for invoking a pinpoint bookmarking function in accordance with various embodiments of the present inventive concept. By way of one example, the bookmark selection icon 1810 can appear when the button or icon 515 is touched, clicked on, or hovered over. In some embodiments, the bookmark selection icon 1810 can cause the pinpoint bookmark list (e.g., 190 of FIG. 1A) to be displayed on the display screen (e.g., 110, 210, etc.) for the user to select a particular bookmark to jump to. In some embodiments, the bookmark selection icon 1810 can cause a new pinpoint bookmark to be created for the highlighted section (e.g., 1705) of the digital content 508.

Figure 19:
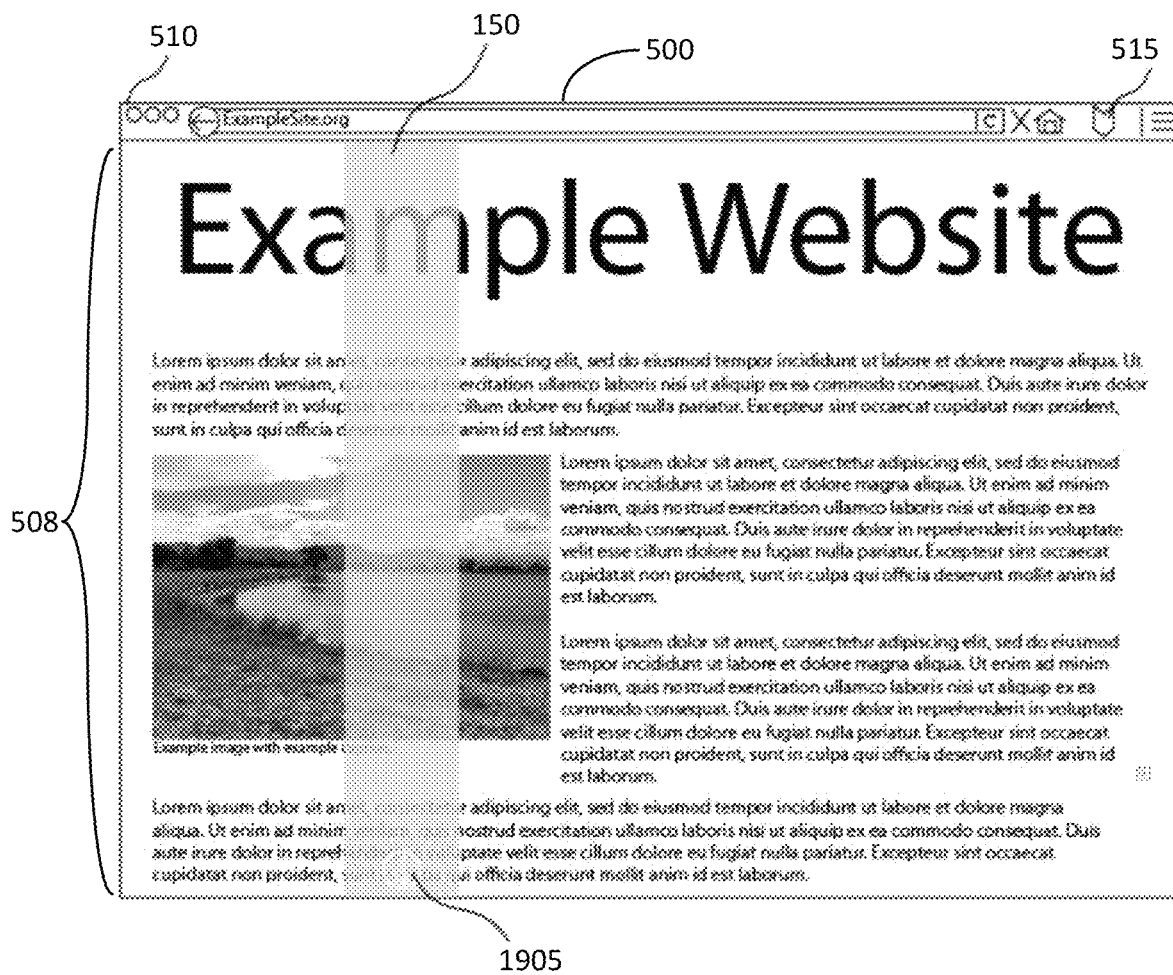
FIG. 19 illustrates a schematic diagram of an example website in which an overlaying translucent pinpoint bookmark extends from a top edge to a bottom edge of the display screen and includes an auto-scroll button which when activated scrolls the webpage to a termination point of a pinpoint bookmark in accordance with various embodiments of the present inventive concept.

FIG. 19 illustrates a schematic diagram of an example website in which an overlaying translucent pinpoint bookmark 150 extends from a top edge of the display screen (e.g., 110, 210, etc.) to a bottom edge of the display screen, and includes an auto-scroll button 1905, which when activated scrolls the webpage to a termination point of a pinpoint bookmark (not shown) in accordance with various embodiments of the present inventive concept. In this manner, the user can be immediately notified that pinpoint bookmark 150 exists on the current page view, and the specific location within the digital content 508 can be discovered by simply clicking or selecting the auto-scroll button 1905. In response to clicking or selecting the auto-scroll button 1905, the digital content 508 can be automatically scrolled until the specific location within the digital content 508 is made visible to the user. In other words, when the digital pinpoint bookmark is out of sight of the user's view, there is an indication that the digital pinpoint bookmark is nevertheless there, and the auto-scroll button 1905 enables the user to automatically scroll and/or go to the spot where the digital pinpoint bookmark terminates.

Figure 20:
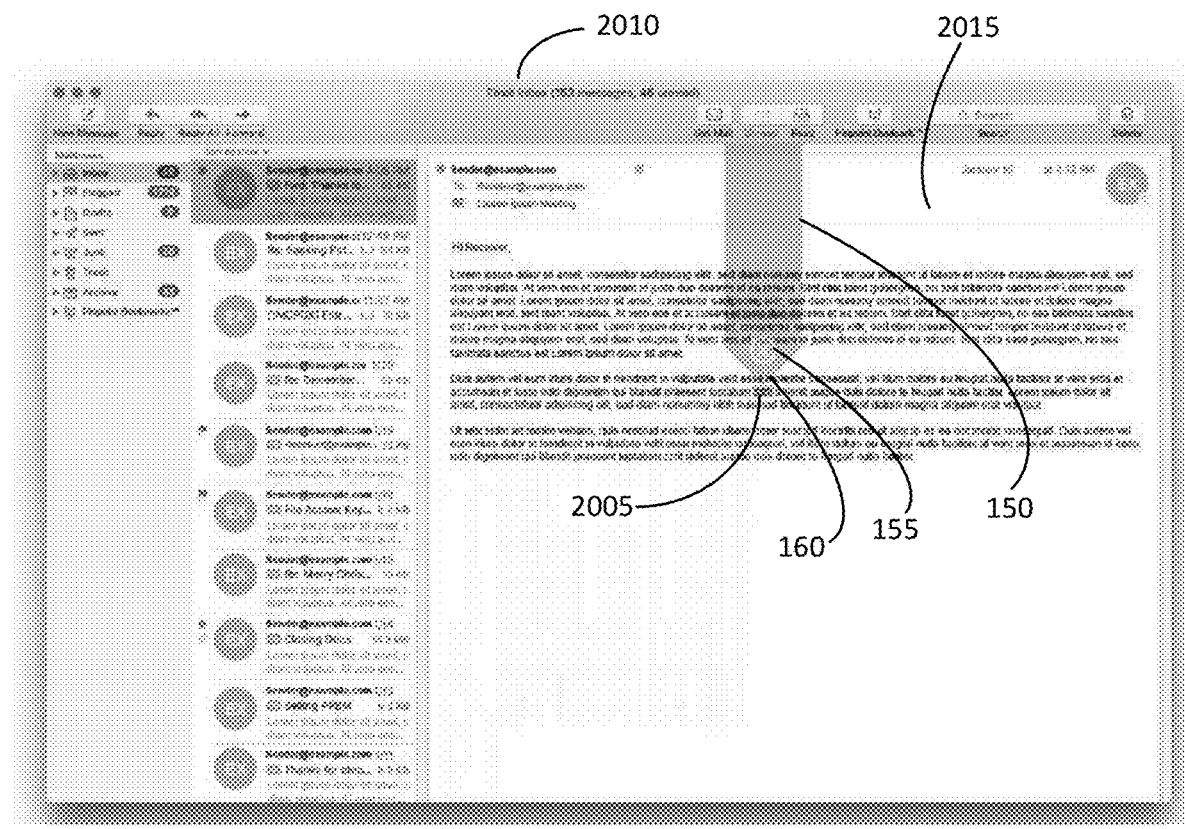
FIG. 20 illustrates a schematic diagram of an example email program displaying a particular email in which an overlaying translucent pinpoint bookmark extends from a top edge of the particular email and points to a specific section of the email in accordance with various embodiments of the present inventive concept.

FIG. 20 illustrates a schematic diagram of an example email program 2010 displaying a particular email 2015 in which an overlaying translucent pinpoint bookmark 150 extends from a top edge of the particular email 2015 and points to a specific section 2005 of the email 2015 in accordance with various embodiments of the present inventive concept. Some reference numerals that appear in FIG. 20 have already been described in detail above. Thus, a detailed description of these is not repeated. It will be understood that the functionality of the various embodiments described herein is applicable to the highlighted section 2005 of the particular email 2015. Any suitable number of pinpoint bookmarks can be placed within any number of emails on the user's computing device.

FIG. 21 illustrates a block diagram of a system 2100 including multiple digital computing devices (e.g., 2105, 2180) each having a local pinpoint database 2120, and a remote server 2160 having a remote pinpoint bookmark database 2165 in accordance with various embodiments of the present inventive concept. Reference is now made to FIGS. 1A, 1B, and 21.

The local pinpoint database 2120 can exist in the non-volatile memory (e.g., 120 of FIG. 1A) and/or the volatile memory (e.g., 125 of FIG. 1A) of the digital computing device 2105. The local pinpoint database 2120 can include metadata 2125. The digital computing device 2105 can include the pinpoint bookmark control logic section 115, a display screen 2130, a user interface 2135, a web browser 2140, a microprocessor 2110, and/or an input/output port 2145. The pinpoint bookmark control logic section 115 can cause the pinpoint bookmarks (e.g., 150) to be set in and removed from webpages loaded by the web browser 2140, to be set in and removed from other digital content within a third party application 2140 such as email client, an ebook, or the like. The user can interact with the pinpoint bookmark control logic section via the user interface 2135.

The input/output port 2145 can communicatively couple the digital computing device 2105 to the remote server 2160 via the cloud 2150. The digital computing device 2105 can use the remote access application programming interface (API) to communicate with the remote server 2160. The digital computing devices 2180 can also be communicatively coupled with the remote server 2160 via the cloud 2150. The digital computing devices (e.g., 2105, 2180) can communicate with the remote server 2160 using a web browser with native functionality, an add-on to the web browser, and/or an extension to the web browser. The personal digital computing devices (e.g., 2105, 2180) can include the mobile device 100 (of FIG. 1A), the desktop computer 200 (of FIG. 2B), the virtual reality system 300 (of FIG. 3A), the augmented reality system 400 (of FIG. 4A), or the like. The user can access the pinpoint bookmark features from any of the multiple personal devices. The remote pinpoint database 2165 can act as a central repository of the user's bookmarks across all of the users personal devices.

The remote server 2160 can include a remote pinpoint database 2165. The remote pinpoint database 2165 can include metadata 2170. The remote server 2160 can communicate with the digital computing devices (e.g., 2105, 2180) using the remote access API 2155 via the cloud 2150. The remote save pinpoint bookmark logic section 192 (of FIG. 1B) of the pinpoint bookmark control logic section 115 can cause the pinpoint bookmark (e.g., 150) and associated metadata (e.g., 2170) to be stored remotely in the remote pinpoint database 2165. The remote pinpoint database 2165 can store all pinpoint bookmarks associated with a user in the remote pinpoint database 2165, across all of the user's digital computing devices (e.g., 2105, 2180). In other words, the remote server 2160 can maintain a central database of pinpoint bookmarks for any digital computing device used by the user. Moreover, the remote server 2160 can manage multiple centralized databases of pinpoint bookmarks for multiple corresponding users. The remote retrieve pinpoint bookmark logic section 194 of the pinpoint bookmark control logic section 115 can cause the pinpoint bookmark 150 and associated metadata 2170 to be retrieved remotely from the remote pinpoint database 2165, so that it can be displayed on the display screen (e.g., 110, 210, etc.) when the user wishes to return to a particular pinpoint bookmark.

In some embodiments, all of the user's saved pinpoint bookmarks and associated metadata are stored in the local pinpoint database 2120 and accessed locally. In some embodiments, all of the user's saved pinpoint bookmarks and associated metadata are stored in the remote pinpoint database 2165. In some embodiments, all of the user's saved pinpoint bookmarks and associated metadata are stored in the local pinpoint database 2120 and the remote pinpoint database 2165. Having the pinpoint bookmarks saved in the remote pinpoint database 2165 allows the user to keep the pinpoint bookmarks synchronized across all of the user's digital computing devices (e.g., 2105, 2180). In addition, if a particular digital computing device (e.g., 2105, 2180) is lost, the list of pinpoint bookmarks is not lost because the pinpoint bookmarks can be stored in the remote pinpoint database 2165.

Figure 22A:
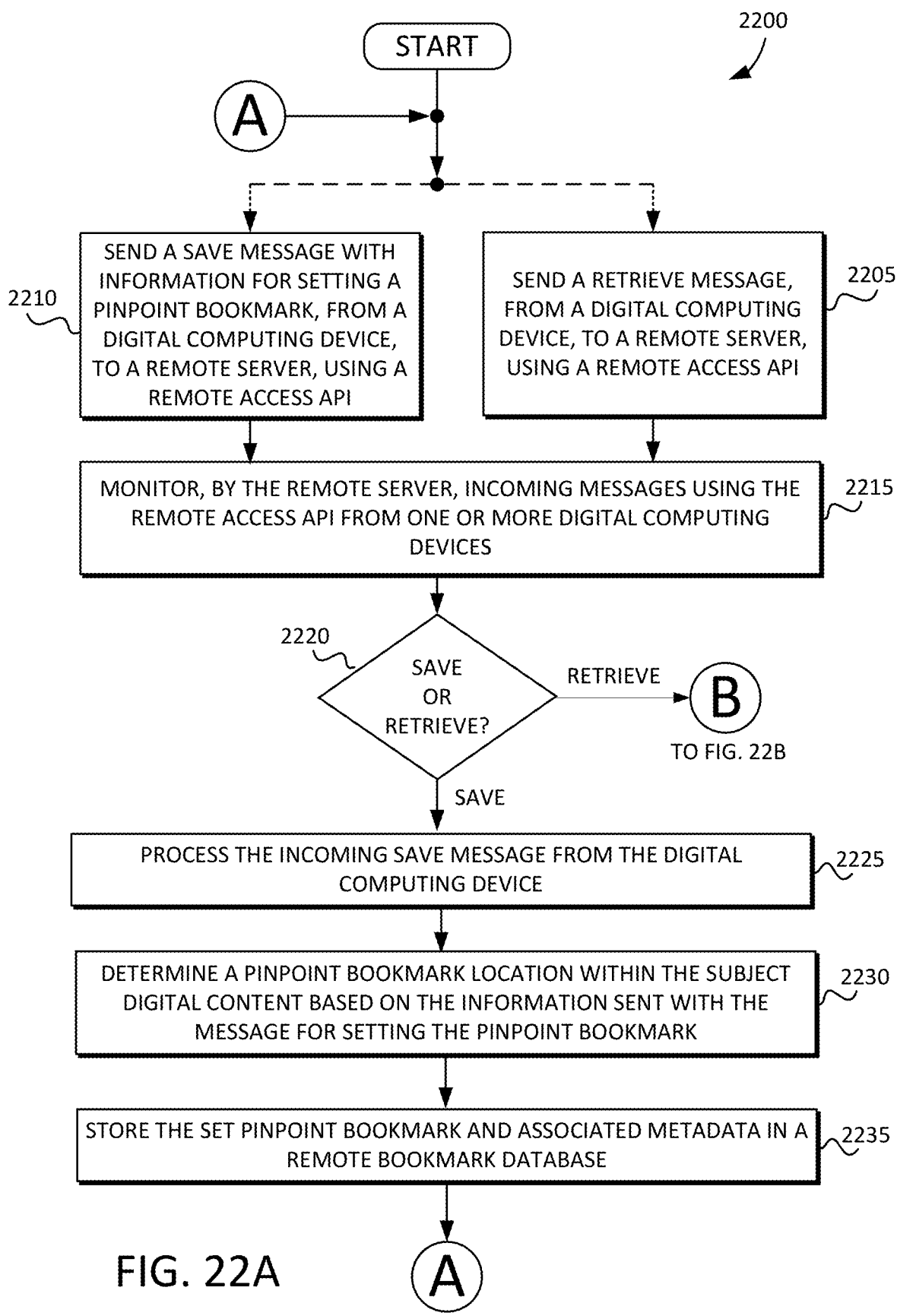
FIGS. 22A and 22B shows a flow diagram illustrating a technique for centrally managing multiple pinpoint bookmarks across disparate digital computing devices in accordance with various embodiments of the present inventive concept.
Figure 22B:
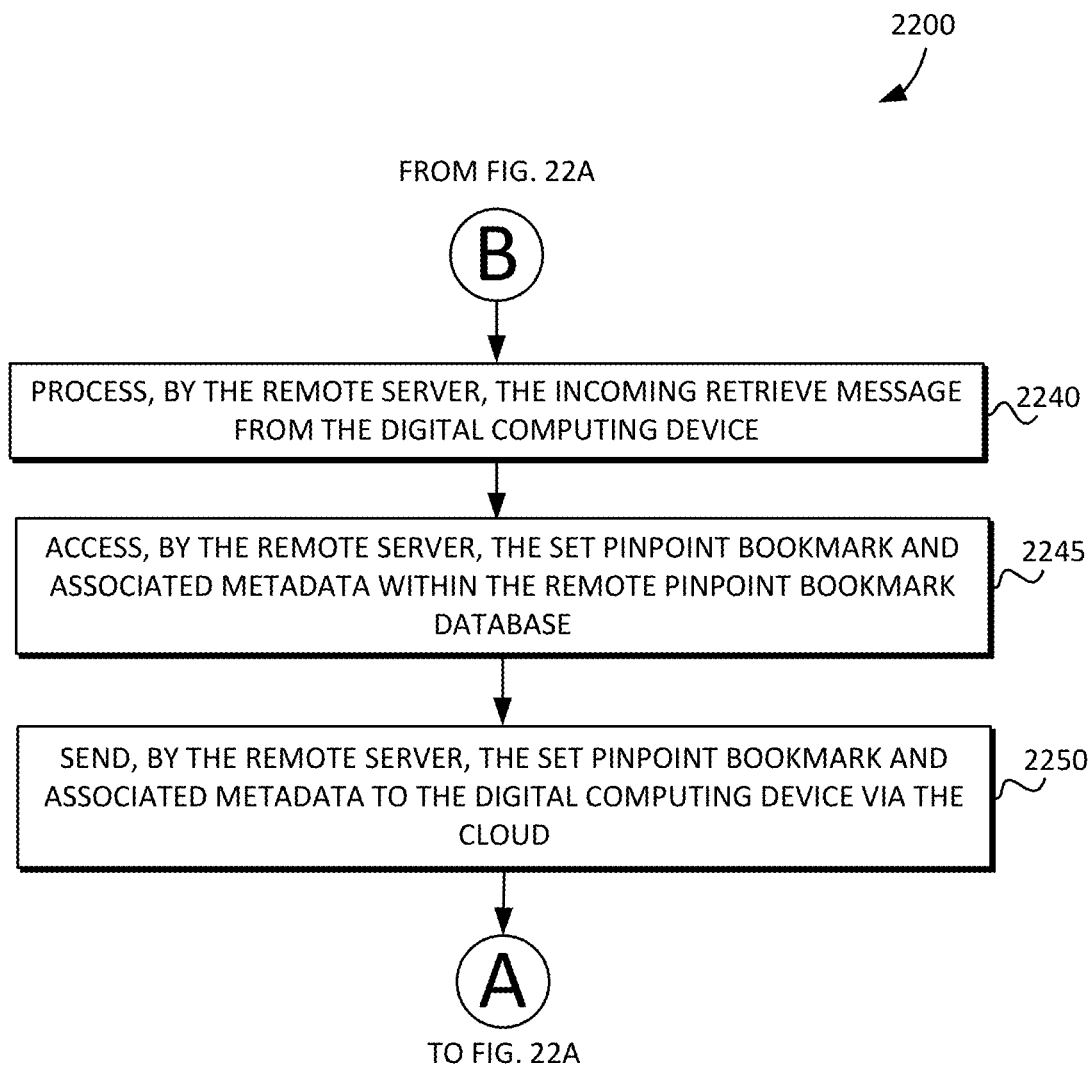

FIGS. 22A and 22B shows a flow diagram 2200 illustrating a technique for centrally managing multiple pinpoint bookmarks across disparate digital computing devices in accordance with various embodiments of the present inventive concept. The technique can begin at the START and proceed along one of two paths 2205 or 2210. At 2205, a retrieve message is sent from a digital computing device to a remote server. The retrieve message can conform to the remote access API. Alternatively, at 2210, a save message with information for setting a pinpoint bookmark can be sent, from a digital computing device, to a remote server. The save message can conform to the remote access API.

At 2215, the remote server can monitor incoming messages from one or more of the digital computing devices using the remote access API. At 2220, a determination can be made whether a save message or a retrieve message is received. In the case of the retrieve message, the flow can continue through the "circle B" to FIG. 22B. Otherwise, in the case of the save message, the flow can proceed to 2225, where the remote server can process the incoming save message that was received from the digital computing device. At 2230, the remote server can determine a pinpoint bookmark location with the subject digital content based on the information sent with the message for setting the pinpoint bookmark. At 2235, the remote server can store the set pinpoint bookmark and associated metadata in a remote bookmark database. The flow can then proceed to "circle A" and return to the beginning.

As shown in FIG. 22B, the flow can come from the "circle B" link from FIG. 22A. At 2240, the remote server can process the incoming retrieve message from the digital computing device. At 2245, the remote server can access the set pinpoint bookmark and associated metadata within the remote pinpoint bookmark database. At 2250, the remote server can send the set pinpoint bookmark and associated metadata to the digital computing device via the cloud.

In some embodiments, a pinpoint bookmark can be automatically set. For example, whenever a user is viewing a particular page of digital content, no matter what is on the page, and the user exits the page or application, the pinpoint bookmark logic section 115 can make an estimation about where the user was within the digital content. The pinpoint bookmark logic section 115 can then set a pinpoint bookmark automatically without user input on the location corresponding to the estimated location within the digital content.

Some embodiments include a method for managing digital multimedia pinpoint bookmarks. The method can include receiving, by a pinpoint bookmark control logic section of a personal digital computing device, a request to set a pinpoint bookmark within digital content on a display screen of the personal digital computing device. The method can include processing, by a microprocessor of the personal digital computing device, the request to set the pinpoint bookmark. The method can include saving, by a local save pinpoint bookmark logic section, the pinpoint bookmark and associated metadata to a non-volatile memory of the personal digital computing device. The method can include causing, by the pinpoint bookmark control logic section of the personal digital computing device, the pinpoint bookmark to be displayed overlaying the digital content on the display screen of the personal digital computing device.

In some embodiments, causing the pinpoint bookmark to be displayed further comprises causing to appear, by the pinpoint bookmark control logic section of the personal digital computing device, on the display screen, a translucent elongated pinpoint bookmark having a termination point that points directly to a specific location within the digital content.

In some embodiments, causing the pinpoint bookmark to be displayed further comprises causing, by the pinpoint bookmark control logic section of the personal digital computing device, a specific section of the digital content to be highlighted, and causing to appear, by the pinpoint bookmark control logic section of the personal digital computing device, on the display screen, the translucent elongated pinpoint bookmark having the termination point that points directly to the specific highlighted section within the digital content.

In some embodiments, the specific highlighted section is at least one of a punctuation mark, a letter, a word, a sentence, a paragraph, or a section of a paragraph, within the digital content.

In some embodiments, the specific highlighted section is at least one of an image, a particular location within a video stream, or a particular location within an audio stream, within the digital content.

In some embodiments, the specific highlighted section is at least one of a virtual reality object or an object in an augmented reality environment, within the digital content. In some embodiments, the specific highlighted section is at least one of (i) a virtual reality object in a virtual reality environment, (ii) a real object in an augmented reality environment, (iii) a virtual object in the augmented reality environment, or (iv) a combination of a real object and a virtual object in the augmented reality environment.

In some embodiments, causing the pinpoint bookmark to be displayed further comprises causing the pinpoint bookmark to extend from at least one of (i) a top edge or (ii) a bottom edge of the display screen to the termination point of the pinpoint bookmark.

In some embodiments, causing the pinpoint bookmark to be displayed further comprises causing the pinpoint bookmark to extend from at least one of (i) a left edge or (ii) a right edge of the display screen to the termination point of the pinpoint bookmark.

In some embodiments, receiving, by the pinpoint bookmark control logic section of the personal digital computing device, the request to set the pinpoint bookmark within the digital content further comprises detecting a selection by a user of a pinpoint bookmark creation icon or menu option visible on the display screen.

In some embodiments, receiving, by the pinpoint bookmark control logic section of the personal digital computing device, the request to set the pinpoint bookmark within digital content further comprises detecting a voice command to create the pinpoint bookmark.

The method can include adding, by a pinpoint bookmark list manager logic section of the pinpoint bookmark control logic section, the personal digital computing device, a link to a pinpoint bookmark to a pinpoint bookmark list. The method can include displaying, by the pinpoint bookmark list manager logic section, the pinpoint bookmark list on the display screen of the personal digital computing device. The method can include receiving, by the pinpoint bookmark list manager logic section, a request to share the pinpoint bookmark with a different personal digital computing device. The method can include sharing, by the the pinpoint bookmark control logic section, the pinpoint bookmark with the different personal digital computing device.

The method can include detecting, by the pinpoint bookmark list manager logic section, a selection of the link to the pinpoint bookmark within the pinpoint bookmark list. The method can include retrieving, by a local retrieve pinpoint bookmark logic section, the pinpoint bookmark and the associated metadata from the non-volatile memory of the personal digital computing device. The method can include causing, by the pinpoint bookmark control logic section, the display screen to jump to the digital content that is associated with the selected link to the pinpoint bookmark. The method can include causing, by the pinpoint bookmark control logic section of the personal digital computing device, a specific section of the digital content to be highlighted that is associated with the selected link to the pinpoint bookmark. The method can include causing to appear, by the pinpoint bookmark control logic section of the personal digital computing device, on the display screen, a translucent elongated pinpoint bookmark having a termination point that points directly to the specific highlighted section within the digital content that is associated with the selected link to the pinpoint bookmark.

In some embodiments, the pinpoint bookmark is referred to as a first pinpoint bookmark, the metadata is referred to as first metadata, and the request is referred to as a first request. The method can include receiving, by the pinpoint bookmark control logic section of the personal digital computing device, a second request to set a second pinpoint bookmark within the digital content on the display screen of the personal digital computing device. The method can include processing, by the microprocessor of the personal digital computing device, the second request to set the second pinpoint bookmark. The method can include saving, by the local save pinpoint bookmark logic section, the second pinpoint bookmark and associated second metadata to the non-volatile memory of the personal digital computing device. The method can include causing, by the pinpoint bookmark control logic section of the personal digital computing device, the second pinpoint bookmark to be displayed overlaying a different portion of the same digital content on the display screen of the personal digital computing device.

In some embodiments, the specific location is referred to as a first specific location, and wherein causing the second pinpoint bookmark to be displayed further comprises:

causing to appear, by the pinpoint bookmark control logic section of the personal digital computing device, on the display screen, a second translucent elongated pinpoint bookmark having the termination point that points directly to a second specific location within the digital content.

In some embodiments, the specific section is referred to as a first specific section, and wherein causing the second pinpoint bookmark to be displayed further comprises causing, by the pinpoint bookmark control logic section of the personal digital computing device, a second specific section of the digital content to be highlighted. The method can include causing to appear, by the pinpoint bookmark control logic section of the personal digital computing device, on the display screen, the second translucent elongated pinpoint bookmark having a termination point that points directly to the second specific highlighted section within the digital content.

In some embodiments, the personal digital computing device is referred to as a first personal digital computing device, the digital content is referred to as first digital content, the pinpoint bookmark control logic section is referred to as a first pinpoint bookmark control logic section, the pinpoint bookmark is referred to as a first pinpoint bookmark, the metadata is referred to as first metadata, the display screen is referred to as a first display screen, the microprocessor is referred to as a first microprocessor, the non-volatile memory is referred to as a first non-volatile memory, and the request is referred to as a first request. The method can include receiving, by a second pinpoint bookmark control logic section of a second personal digital computing device, a second request to set a second pinpoint bookmark within second digital content on a second display screen of a second personal digital computing device. The method can include processing, by a second microprocessor of the second personal digital computing device, the second request to set the second pinpoint bookmark. The method can include transmitting, by a remote save pinpoint bookmark logic section, the second pinpoint bookmark and associated second metadata to a remote pinpoint database of a remote server using a remote access application specific interface (API) via the cloud. The method can include causing, by the second pinpoint bookmark control logic section of the second personal digital computing device, the second pinpoint bookmark to be displayed overlaying the second digital content on the second display screen of the second personal digital computing device.

In some embodiments, the specific location is referred to as a first specific location, the translucent elongated pinpoint bookmark is referred to as a first translucent elongated pinpoint bookmark. In some embodiments, causing the second pinpoint bookmark to be displayed further comprises causing to appear, by the second pinpoint bookmark control logic section of the second personal digital computing device, on the second display screen, a second translucent elongated pinpoint bookmark having a termination point that points directly to a second specific location within the second digital content. The method can include causing, by the second pinpoint bookmark control logic section of the second personal digital computing device, a specific section of the second digital content to be highlighted. The method can include causing to appear, by the second pinpoint bookmark control logic section of the second personal digital computing device, on the second display screen, the second translucent elongated pinpoint bookmark having a termination point that points directly to the second specific highlighted section within the second digital content.

The method can include receiving, by a first remote retrieve pinpoint bookmark logic section of the first pinpoint bookmark control logic section of the first personal digital computing device, the first pinpoint bookmark and the associated first metadata from the remote pinpoint database of the remote server using the remote access API via the cloud. The method can include causing, by the first pinpoint bookmark control logic section of the first personal digital computing device, the first display screen to jump to the first digital content. The method can include causing, by the first pinpoint bookmark control logic section of the first personal digital computing device, the specific section of the first digital content to be highlighted. The method can include causing to appear, by the first pinpoint bookmark control logic section of the first personal digital computing device, on the first display screen, the first translucent elongated pinpoint bookmark having a termination point that points directly to the specific highlighted section within the first digital content. The method can include receiving, by a second remote retrieve pinpoint bookmark logic section of the second pinpoint bookmark control logic section of the second personal digital computing device, the first pinpoint bookmark and the associated first metadata from the remote pinpoint database of the remote server using the remote access API via the cloud. The method can include causing, by the second pinpoint bookmark control logic section of the second personal digital computing device, the second display screen to jump to the first digital content. The method can include causing, by the second pinpoint bookmark control logic section of the second personal digital computing device, the specific section of the first digital content to be highlighted. The method can include causing to appear, by the second pinpoint bookmark control logic section of the second personal digital computing device, on the second display screen, the first translucent elongated pinpoint bookmark having the termination point that points directly to the specific highlighted section within the first digital content.

The method can include causing, by the pinpoint bookmark control logic section of the personal digital computing device, an automatic scroll button to appear within the pinpoint bookmark that is displayed overlaying the digital content on the display screen of the personal digital computing device when a termination point of the pinpoint bookmark is not visible on the display screen. The method can include detecting, by the pinpoint bookmark control logic section, a selection of the automatic scroll button. The method can include causing, by the pinpoint bookmark control logic section, the digital content to scroll until the termination point is visible on the display screen. The method can include automatically repositioning and resizing, by the pinpoint bookmark control logic section, the pinpoint bookmark on the display screen to keep it correctly positioned even when other elements shown on the display screen are repositioned or resized. The method can include causing, by the pinpoint bookmark control logic section of the personal digital computing device, a close icon to appear within the pinpoint bookmark that is displayed overlaying the digital content on the display screen of the personal digital computing device. The method can include detecting, by the pinpoint bookmark control logic section, a selection made of the close icon. The method can include removing, by the pinpoint bookmark control logic section, the pinpoint bookmark from the display screen. The method can include deleting, by the pinpoint bookmark control logic section, the pinpoint bookmark and the associated metadata from the non-volatile memory of the personal digital computing device.

The method can include in an absence of the request to set a pinpoint bookmark within the digital content on the display screen of the personal digital computing device, automatically making an estimation about where the pinpoint bookmark should be set within the digital content. The method can include automatically saving, by the local save pinpoint bookmark logic section, the pinpoint bookmark and the associated metadata to the non-volatile memory of the personal digital computing device.

The various operations of methods described above may be performed by any suitable means capable of performing the operations, such as various hardware and/or software component(s), circuits, and/or module(s).

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a metaverse and/or virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A system, comprising:
  a pair of augmented reality smart glasses including a translucent display;
  a memory device;
  at least one of a microcontroller or a hand controller configured to select a real object that is viewable via the translucent display; and
  a pinpoint bookmark control logic section coupled to the memory device,
  wherein:
  the at least one of the microcontroller or the hand controller is configured to select the real object in an augmented reality environment;
  the pinpoint bookmark control logic section is configured to cause the display to overlay a pinpoint bookmark on the display pointing to the real object in the augmented reality environment;
  the pinpoint bookmark is a first pinpoint bookmark;
  the at least one of the microprocessor or the hand controller is configured to select a combination of a virtual object and the real object in the augmented reality environment;
  the pinpoint bookmark control logic section is configured to cause the display to overlay a second pinpoint bookmark on the display pointing to the combination of the virtual object and the real object in the augmented reality environment;
  the pinpoint bookmark control logic section is configured to automatically reposition the second pinpoint bookmark on the display to keep the second pinpoint bookmark pointing at the combination of the virtual object and the real object; and
  the pinpoint bookmark control logic section is configured to automatically resize the second pinpoint bookmark on the display to keep the second pinpoint bookmark pointing at the combination of the virtual object and the real object.

2. The system of claim 1, wherein the pinpoint bookmark control logic section is configured to automatically reposition the pinpoint bookmark on the display to keep the pinpoint bookmark pointing at the real object.

3. The system of claim 1, wherein the pinpoint bookmark control logic section is configured to automatically resize the pinpoint bookmark on the display to keep the pinpoint bookmark pointing at the real object.

4. The system of claim 1, wherein the memory device is configured to save the pinpoint bookmark.

5. The system of claim 1, wherein:
the at least one of the microprocessor or the hand controller is configured to select the real object in the augmented reality environment responsive to a first voice command;
the at least one of the microprocessor or the hand controller is configured to select a virtual object in the augmented reality environment responsive to a second voice command; and
the pinpoint bookmark control logic section is configured to cause the display to overlay the second pinpoint bookmark on the display pointing to the virtual object in the augmented reality environment.

6. The system of claim 1, wherein:
the at least one of the microprocessor or the hand controller is configured to highlight at least one of i) the real object, ii) the virtual object, or iii) a combination of the real object and the virtual object on the display in the augmented reality environment; and
responsive to a voice command from the user, the pinpoint bookmark control logic section is configured to cause the display to overlay the second pinpoint bookmark on the display pointing directly to the highlighted at least one of i) the real object, ii) the virtual object, or iii) the combination of the real object and the virtual object in the augmented reality environment.

7. The system of claim 1, wherein the pinpoint bookmark is a translucent elongated pinpoint bookmark having the form of an arrow with a single termination point on an end thereof; and
wherein the pinpoint bookmark control logic section is configured to cause an automatic scroll button to appear within the pinpoint bookmark on the display when the termination point of the pinpoint bookmark is not visible on the display.

8. The system of claim 1, wherein the pinpoint bookmark control logic section is configured to detect a selection by the user of at least one of a pinpoint bookmark creation icon or menu option visible on the display.

9. The system of claim 1, wherein the real object is any type of object in the real world.

10. A system, comprising:
virtual reality head gear including a display;
a memory device;
at least one of a microprocessor or a hand controller configured to select a virtual object that is viewable via the display; and
a pinpoint bookmark control logic section coupled to the memory device,
wherein:
the at least one of the microprocessor or the hand controller is configured to select the virtual object in a virtual reality environment;
the pinpoint bookmark control logic section is configured to cause the display to overlay a pinpoint bookmark on the display pointing to the virtual object in the virtual reality environment;
the pinpoint bookmark is a first pinpoint bookmark;
the virtual object is a first virtual object;
the at least one of the microprocessor or the hand controller is configured to select a combination of the first virtual object and a second object in the virtual reality environment;
the pinpoint bookmark control logic section is configured to cause the display to overlay a second pinpoint bookmark on the display pointing to the combination of the first virtual object and the second object in the virtual reality environment;
the pinpoint bookmark control logic section is configured to automatically reposition the second pinpoint bookmark on the display to keep the second pinpoint bookmark pointing at the combination of the first virtual object and the second object; and
the pinpoint bookmark control logic section is configured to automatically resize the second pinpoint bookmark on the display to keep the second pinpoint bookmark pointing at the combination of the first virtual object and the second object.

11. The system of claim 10, wherein the pinpoint bookmark control logic section is configured to automatically reposition the pinpoint bookmark on the display to keep the pinpoint bookmark pointing at the virtual object.

12. The system of claim 10, wherein the pinpoint bookmark control logic section is configured to automatically resize the pinpoint bookmark on the display to keep the pinpoint bookmark pointing at the virtual object.

13. The system of claim 10, wherein the memory device is configured to save the pinpoint bookmark.

14. The system of claim 10, wherein:
the at least one of the microprocessor or the hand controller is configured to highlight the virtual object on the display in the virtual reality environment; and
responsive to a voice command from the user, the pinpoint bookmark control logic section is configured to cause the display to overlay the pinpoint bookmark on the display pointing directly to the highlighted virtual object in the virtual reality environment.

15. The system of claim 10, wherein the pinpoint bookmark is a translucent elongated pinpoint bookmark having the form of an arrow with a single termination point on an end thereof; and
wherein the pinpoint bookmark control logic section is configured to cause an automatic scroll button to appear within the pinpoint bookmark on the display when the termination point of the pinpoint bookmark is not visible on the display.

16. The system of claim 15, wherein the pinpoint bookmark control logic section is configured to automatically scroll the virtual reality environment on the display when the termination point of the pinpoint bookmark is not visible on the display.

17. A system, comprising:
virtual reality head gear including a display;
a memory device;
a hand controller configured to select a virtual object that is viewable via the display; and
a pinpoint bookmark control logic section coupled to the memory device, wherein the hand controller is configured to be grasped by a user to select the virtual object in a virtual reality environment;

wherein the pinpoint bookmark control logic section is configured to cause the display to overlay a pinpoint bookmark on the display pointing to the virtual object in the virtual reality environment;

wherein the pinpoint bookmark is a translucent elongated pinpoint bookmark having the form of an arrow with a single termination point on an end thereof; and wherein the pinpoint bookmark control logic section is configured to cause an automatic scroll button to appear within the pinpoint bookmark on the display when the termination point of the pinpoint bookmark is not visible on the display.

\* \* \* \* \*